United States Patent
Porro et al.

(10) Patent No.: US 11,992,789 B2
(45) Date of Patent: May 28, 2024

(54) HIGH PRESSURE STRIPPERS FOR USE IN UREA PLANTS

(71) Applicant: YARA INTERNATIONAL ASA, Oslo (NO)

(72) Inventors: Lino Giovanni Porro, Etterbeek (BE); Luigi Serraiocco, Skien (NO)

(73) Assignee: YARA INTERNATIONAL ASA, Oslo (NO)

( * ) Notice: Subject to any disclaimer, the term of this patent is extended or adjusted under 35 U.S.C. 154(b) by 435 days.

(21) Appl. No.: 17/297,611

(22) PCT Filed: Jan. 29, 2020

(86) PCT No.: PCT/EP2020/052085
§ 371 (c)(1),
(2) Date: May 27, 2021

(87) PCT Pub. No.: WO2020/157089
PCT Pub. Date: Aug. 6, 2020

(65) Prior Publication Data
US 2022/0008838 A1 Jan. 13, 2022

(30) Foreign Application Priority Data
Jan. 29, 2019 (EP) .................................. 19154183

(51) Int. Cl.
*F25B 29/00* (2006.01)
*B01D 1/00* (2006.01)
*B01D 1/06* (2006.01)
*B01D 3/34* (2006.01)
*F28D 7/00* (2006.01)
*F28D 7/16* (2006.01)
*F28D 15/00* (2006.01)
*F28F 9/22* (2006.01)
*F28D 21/00* (2006.01)

(52) U.S. Cl.
CPC ........... *B01D 3/346* (2013.01); *B01D 1/0041* (2013.01); *B01D 1/06* (2013.01); *F28D 7/1676* (2013.01); *F28F 9/22* (2013.01); *F28D 2021/0022* (2013.01); *F28F 2009/226* (2013.01); *F28F 2009/228* (2013.01)

(58) Field of Classification Search
CPC ............... F28F 1/003; F28F 9/22; F28F 19/00
USPC ............ 165/48.1, 65, 104.11, 159, DIG. 355
See application file for complete search history.

(56) References Cited

U.S. PATENT DOCUMENTS

| 6,284,922 B1 | 9/2001 | Pagani et al. | |
| 2009/0301699 A1* | 12/2009 | Karrs | F28F 9/22 165/159 |

FOREIGN PATENT DOCUMENTS

| GB | 1203233 A | 8/1970 |
| WO | 20090148822 A2 | 12/2009 |

OTHER PUBLICATIONS

PCT International Search Report issued in PCT Application No. PCT/EP2020/052085; dated Mar. 12, 2020; 13 pages.
(Continued)

*Primary Examiner* — Monzer R Chorbaji
(74) *Attorney, Agent, or Firm* — Dilworth IP, LLC

(57) ABSTRACT

Shell-and-tube strippers for stripping a urea/carbamate mixture, related systems, methods, and uses. The stripper includes a shell and a plurality of tubes disposed within the shell. Baffles and deflectors offer improved homogeneity of heating fluid flow in the stripper's shell-side space.

19 Claims, 17 Drawing Sheets

(56) References Cited

OTHER PUBLICATIONS

PCT International Preliminary Report on Patentability issued in PCT Application No. PCT/EP2020/052085; dated Apr. 26, 2021; 16 pages.

* cited by examiner

HIGH PRESSURE STRIPPERS FOR USE IN UREA PLANTS

CROSS REFERENCE TO RELATED APPLICATIONS

This application is a national stage application, filed under 35 U.S.C. § 371, of International Patent Application No. of PCT/EP2020/052085, filed on Jan. 29, 2020, which claims benefit to European Patent Application No. 19154183.8 filed on Jan. 29, 2019.

TECHNICAL FIELD

The present invention is in the field of urea manufacture, in particular in the field of high pressure strippers for decomposing carbamate and stripping ammonia in urea/carbamate mixtures from urea reactors in urea plants.

BACKGROUND

High Pressure Strippers are used in urea plants to concentrate urea, by removing the carbamate from a liquid urea/carbamate mixture. The urea/carbamate mixture is a solution of urea, ammonium carbamate, free ammonia and water, coming from a reactor in which urea is formed by the reaction of ammonia and $CO_2$ into ammonium carbamate (also referred to as carbamate) and subsequent dehydration of carbamate to produce urea. The conversion of carbamate into urea is, in practical terms, never complete and the solution leaving the urea reactor always comprises some carbamate and free ammonia.

A common way of removing carbamate and of concentrating the solution involves the use of a tube heat exchanger, called High Pressure Stripper, operating at a similar pressure to that of the urea reactor. Under the influence of the heat provided by a heating medium such as steam, the ammonium carbamate in the urea and carbamate mixture decomposes to form gaseous $NH_3$ and $CO_2$. These $NH_3$ and $CO_2$ gases are removed from the stripper. Accordingly, liquid urea is produced which is collected at the bottom of the stripper.

Two categories of high-pressure strippers currently exist: $CO_2$ strippers and self-strippers.

In $CO_2$ strippers, $CO_2$ is used as a stripping gas. It is fed to the bottom of the High Pressure Stripper and $NH_3$ and $CO_2$ produced during the decomposition of ammonium carbamate are entrained by the $CO_2$ stripping gas.

In self-strippers, no stripping gas is added to the stripper, but $NH_3$ and $CO_2$ formed during the decomposition of ammonium carbamate serve as the stripping gas.

The strippers comprise tubes and a shell, a top end, and a bottom end. During normal use, the top end is situated at the top of the stripper and the bottom end is situated at the bottom of the stripper. At the top end, a urea/carbamate mixture is distributed in the tubes and a gas mixture comprising stripping gas and entrained $NH_3$ and $CO_2$ formed during carbamate decomposition leave the stripper. At the bottom end, the stripped urea solution is collected. In the case of $CO_2$ strippers, $CO_2$ stripping gas is provided to the bottom end of the carbamate decomposer.

During normal operation, the tubes are installed substantially vertically. They enclose a tube-side space. A shell-side space is disposed between the tubes and the shell. The stripping gas and the urea/carbamate mixture run countercurrent through the tube-side space while the urea/carbamate mixture is heated by means of a heating medium in the shell-side space, commonly steam. The urea/carbamate mixture flows into the tubes in a falling film pattern, while the gases rise in the inner part of the tubes.

It would be desirable to scale up such strippers in order to manufacture large volumes of urea in a cost-efficient way. Unfortunately, scaling up these strippers is not always easy and many unforeseen problems tend to occur during upscaling.

SUMMARY

The inventors identified two issues during upscaling of shell-and-tube strippers: severe tube corrosion and inefficient stripping. These issues are solved by way of the presently disclosed strippers, systems, and methods.

In particular, provided herein is a shell-and-tube stripper for stripping a urea/carbamate mixture, the stripper comprising a top end in fluid connection with a bottom end through a plurality of tubes disposed within a shell; the top end comprising an inlet for a urea/carbamate mixture and an outlet for a gas mixture comprising the stripping gas and one or more stripped compounds; the bottom end comprising an outlet for a urea/carbamate stream concentrated in urea; the shell-and-tube stripper further comprising a heating fluid inlet and a heating fluid outlet in fluid connection with a shell-side space disposed between the plurality of tubes and the shell and a steam belt distributor and an inlet deflector for homogenizing the flow of steam near the steam inlet; the shell-and-tube stripper having a longitudinal direction and lateral cross sections, the longitudinal direction being parallel to the tubes and the lateral cross sections being perpendicular to the longitudinal direction; wherein a plurality of baffles are arranged in the shell-side space, the baffles defining a multi-pass crossflow in the shell-side space, wherein the baffles are parallel with the lateral cross sections; characterized in that the stripper further comprises a plurality of deflectors positioned in the flow path, wherein the deflectors are at oblique or right angles with respect to the baffles.

In some embodiments, at least 80% of the deflectors are associated with a baffle, preferably wherein at least 90% of the deflectors are associated with a baffle.

In some embodiments, the deflectors which are associated with a baffle are physically attached to the baffle they are associated with.

In some embodiments, the stripper comprises more than 3000 tubes, or more than 4000 tubes, or more than 5000 tubes, or more than 6000 tubes, or more than 7000 tubes, or 3000 to 7000 tubes, or 4000 to 6000 tubes, or 5000 to 7000 tubes, or 5000 to 10000 tubes.

In some embodiments, the deflectors are at an angle between 10.0° and 90.0° with the baffles; and/or the deflectors describe an arc between 10.0° and 80.0° along a cross section through the shell-and-tube stripper which is parallel to the longitudinal direction and/or the deflectors describe an arc between 10.0° and 80.0° along a lateral cross section through the shell-and-tube stripper.

In some embodiments, the deflectors are arched.

In some embodiments, the deflectors and/or the baffles are perforated, optionally wherein the perforations are circular.

In some embodiments, the baffles are single segmental baffles, each segmental baffle being shaped as a circular segment having a chord, wherein the single segmental baffles are perpendicular to the longitudinal direction within a margin of error of less than 1.0%, wherein the single segmental baffles are consecutively positioned along the longitudinal direction of the shell-and-tube stripper, wherein the orientation of the single segmental baffles varies along the longitudinal direction of the shell-and-tube stripper, and wherein deflectors are positioned between consecutive single segmental baffles.

In some embodiments, the baffles are disk-and-doughnut baffles comprising disk baffles and doughnut baffles, each disk baffle being shaped as a disk, and each doughnut baffle being shaped as a ring comprising a hole, the diameter of the disk baffles being equal to or bigger than the diameter of the hole in the doughnut baffles within a margin of error of less than 10.0%, the disk baffles and the doughnut baffles being positioned perpendicular to the longitudinal direction within a margin of error of less than 1.0%, the disk baffles and the doughnut baffles being consecutively and alternatingly positioned along the longitudinal direction of the shell-and-tube stripper, wherein the deflectors are positioned between adjacent disk baffles and doughnut baffles.

In some embodiments, the baffles are double segmental baffles comprising outer baffles and inner baffles, each outer baffle being shaped as a circular segment having a chord, two outer baffles being arranged on opposing sides of a lateral cross section through the shell-and-tube stripper, the inner baffles being shaped as a mirror symmetrical area between the outer baffles, two outer baffles and an inner baffle being positioned perpendicular to the longitudinal direction within a margin of error of less than 1.0%, wherein two outer baffles and an inner baffle are alternatingly positioned along the longitudinal direction of the shell-and-tube stripper, and wherein the deflectors are positioned between adjacent inner baffles and outer baffles.

In some embodiments, the baffles are double segmental baffles comprising outer baffles and inner baffles, each outer baffle being shaped as a circular segment having a chord, two outer baffles being arranged on opposing sides of a lateral cross section through the shell-and-tube stripper, the inner baffles being shaped as a mirror symmetrical area between two circle segments having parallel chords, two outer baffles and an inner baffle being positioned perpendicular to the longitudinal direction within a margin of error of less than 1.0%, wherein two outer baffles and an inner baffle are alternatingly positioned along the longitudinal direction of the shell-and-tube stripper, and wherein the deflectors are positioned between adjacent inner baffles and outer baffles.

In some embodiments, a second heating fluid inlet is in fluid connection with the shell-side space and is installed between the aforementioned heating fluid inlet and the heating fluid outlet.

Further provided is a system for the production of urea comprising a carbamate condenser, a urea reactor, and a shell-and-tube stripper as provided herein.

Further provided is the use of a shell-and tube stripper as described herein for stripping a urea-carbamate mixture.

Further provided is a method for stripping a urea/carbamate mixture, the method comprising the steps:
providing a stripper as described herein;
providing the urea/carbamate mixture to the inlet for the urea/carbamate mixture;
providing a heating fluid to the shell-side space by means of the heating fluid inlet;
contacting the urea/carbamate mixture and the stripping gas in a tube-side space disposed within the tubes, and heating the urea/carbamate mixture by means of the heating fluid, thereby obtaining a urea/carbamate stream concentrated in urea;
extracting the urea/carbamate stream concentrated in urea at the outlet for the urea/carbamate stream concentrated in urea;
extracting a gas mixture comprising one or more stripped compounds at the outlet for the gas mixture, the one or more stripped compounds comprising $NH_3$, $CO_2$, and water;
extracting the heating fluid at the heating fluid outlet.

DESCRIPTION OF THE FIGURES

The following description of the figures of specific embodiments of the invention is only given by way of example and is not intended to limit the present explanation, its application or use. In the drawings, identical reference numerals refer to the same or similar parts and features.

Figure 1:
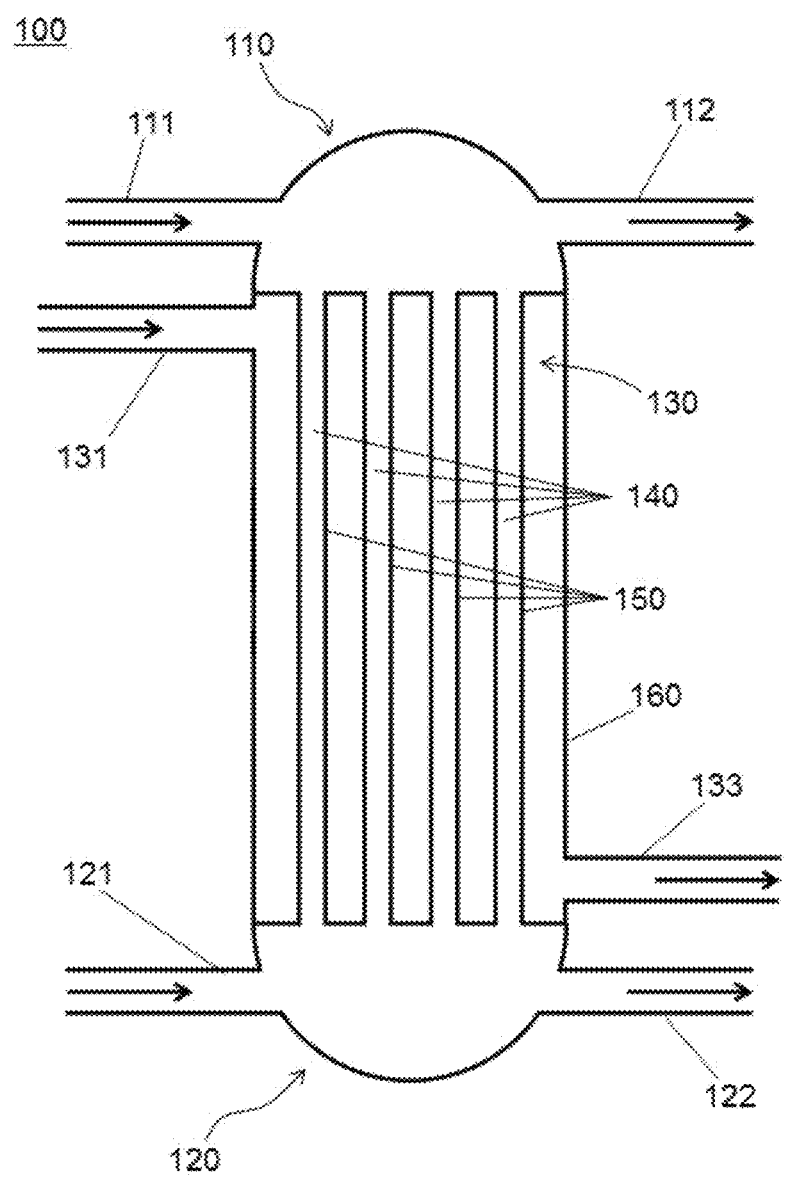
FIG. 1 shows an embodiment of a $CO_2$ stripper (100).

The following reference numerals are used in the description and figures:

100—stripper; 101—stripping gas feed; 102—tube for a urea/carbamate stream; 103—tube for stream comprising stripping gas and one or more stripped compounds; 104—tube for a urea/carbamate stream concentrated in urea; 110—top end (on top of the stripper during normal use); 111—inlet for a urea/carbamate mixture; 112—outlet for a gas mixture; 120—bottom end (at the bottom of the stripper during normal use); 121—inlet for stripping gas; 122—outlet for a urea/carbamate solution concentrated in urea; 130—shell-side space; 131—heating fluid inlet; 132—second heating fluid inlet; 133—heating fluid outlet; 134—single segmental baffle; 1351—outer baffle; 1352—inner baffle; 1353—segmented equalization baffle; 1360—disk baffle; 1361—doughnut baffle; 137—deflector; 138—perforation; 1371—deflector part; 140—tube-side space; 150—tube; 151—top tube sheet; 152—bottom tube sheet; 153— corrosion area; 154—scaling area; 160—shell; 170—steam belt distributor; 171—belt-shaped space; 173—stream lines; 175—side opening; 176—central opening; 177—isobars; 178—perforated area of steam belt distributor; 179—non-perforated area of steam belt distributor; 200—reactor; 201—tube for vapours of $NH_3$, $CO_2$, water, and inerts; 300—carbamate condenser; 301—tube for gaseous stream; 302—tube for carbamate solution stream; 400—scrubber; 401—tube for carbamate solution feed from downstream section; 402—tube for stream of inert gases; 500—heating fluid supply; 501—vapour generator; 502—connection to external heating fluid supply; 503—tube for heating fluid stream; 504—tube for cooled heating fluid stream; 600—high-pressure injector; 601—ammonia feed; 700—ferrule; 710—hole for urea/carbamate mixture; 720—hole for gas; 800—obstructed area; 810—unobstructed area; 1000—high pressure section of a urea plant; H—height of steam belt distributor.

DESCRIPTION OF THE INVENTION

As used below in this text, the singular forms "a", "an", "the" include both the singular and the plural, unless the context clearly indicates otherwise.

The terms "comprise", "comprises" as used below are synonymous with "including", "include" or "contain", "contains" and are inclusive or open and do not exclude additional unmentioned parts, elements or method steps. Where this description refers to a product or process which "comprises" specific features, parts or steps, this refers to the possibility that other features, parts or steps may also be present, but may also refer to embodiments which only contain the listed features, parts or steps.

The enumeration of numeric values by means of ranges of figures comprises all values and fractions in these ranges, as well as the cited end points.

The term "approximately" as used when referring to a measurable value, such as a parameter, an amount, a time period, and the like, is intended to include variations of +/−10% or less, preferably +/−5% or less, more preferably +/−1% or less, and still more preferably +/−0.1% or less, of and from the specified value, in so far as the variations apply to the invention disclosed herein. It should be understood that the value to which the term "approximately" refers per se has also been disclosed.

All references cited in this description are hereby deemed to be incorporated in their entirety by way of reference.

Unless defined otherwise, all terms disclosed in the invention, including technical and scientific terms, have the meaning which a person skilled in the art usually gives them. For further guidance, definitions are included to further explain terms which are used in the description of the invention.

In the process of scaling up high-pressure shell-and-tube strippers for decomposition of urea-carbamate mixtures a remarkable corrosion pattern was observed. In particular, it was found that some tubes in high-pressure strippers for decomposition of urea-carbamate mixtures suffer from more severe corrosion than others. Without the invention being bound by any particular theory or mode of operation, it is believed that the corrosion-related issues are related to tube corrosion induced by ammonium carbamate at high temperature. It was further discovered that the corrosion-related issues can be explained by inhomogeneous heating of the tubes; ammonium carbamate causes more severe corrosion at higher temperatures such that inhomogeneous heating of the tubes causes inhomogeneous corrosion. During normal operation, the methods and devices disclosed herein improve temperature homogeneity in the liquid ammonium carbamate phase and as a consequence, lateral temperature variations are reduced. This in turn improves the homogeneity by which the tubes are heated, reduces tube corrosion, and increases the useful life of strippers.

The inventors further discovered that the corrosion-related issues can be solved by means of the stripper designs disclosed herein. Thus, it can be ensured that the tubes in the strippers according to the present invention have an expected lifetime of around 20 to 30 years.

While the present invention was discovered in the context of scaling up strippers, it is not believed that the advantages offered by the present invention are anyhow limited to strippers of any particular size.

The term "carbamate" as used herein refers to ammonium carbamate. The term "urea/carbamate mixture" as used herein refers to a mixture comprising urea, ammonium carbamate, ammonia, and water. In some embodiments, the urea/carbamate mixture consists of 31 to 34 wt % urea, 32 to 35 wt % ammonium carbamate, 16 to 18 wt % ammonia, 0.1 to 0.3 wt % biuret, the balance being made up of water.

The expression "stripping a urea/carbamate mixture" as used herein refers to a process of decomposing ammonium carbamate comprised in the mixture to form ammonia and carbon dioxide. The formed ammonia and carbon dioxide are entrained by a stripping gas. Also, water comprised in the urea/carbamate mixture is at least partially entrained by the stripping gas as well.

The stripper is particularly useful as a high-pressure stripper in a urea plant that also contains a urea reactor. Such strippers commonly operate at a pressure which is similar to that of the urea reactor.

Provided herein is a shell-and-tube stripper for stripping a urea/carbamate mixture. The present invention is applicable to any kind of stripper for stripping urea/carbamate mixtures.

In particular, it is applicable to both self-strippers and $CO_2$ strippers. In $CO_2$ strippers, $CO_2$ is used as a stripping gas. It is fed to the bottom of the High Pressure Stripper and $NH_3$ and $CO_2$ produced during the decomposition of ammonium carbamate are entrained by the $CO_2$ stripping gas. In self-strippers, no stripping gas is added to the stripper, but $NH_3$ and $CO_2$ formed during the decomposition of ammonium carbamate serve as the stripping gas.

Accordingly, in some embodiments, the stripper is a $CO_2$ stripper, and the stripping gas is $CO_2$.

Alternatively, in some embodiments, the stripper is a self-stripper, and the stripping gas is $NH_3$ and $CO_2$ generated by decomposition of the carbamate. When the stripper is a self-stripper, its bottom end does not comprise an inlet for a stripping gas. This notwithstanding, the bottom-end of self-strippers preferably does comprise an inlet for a passivating gas stream. Preferably, air is used as a passivating gas stream. Note thought that the flow rates of the passivating air stream are so low that they do not contribute in any meaningful way to the stripping process itself. Typical flow rates of passivating air are 50 to 250 kg/hour, or 50 to 500 kg/hour of air.

The top end of the stripper comprises an inlet for a urea/carbamate mixture and an outlet for a gas mixture comprising the stripping gas and one or more stripped compounds. When a urea/carbamate mixture is stripped, the one or more stripped compounds comprise $NH_3$, $CO_2$, and water.

The stripper comprises a top end and a bottom end. The top end is in fluid connection with the bottom end through a plurality of tubes which are disposed within a shell. Equivalently, the top end could be called a first end, and the bottom end could be called a second end.

The top end comprises an inlet for a urea/carbamate mixture and an outlet for a gas mixture comprising the stripping gas and one or more stripped compounds.

The bottom end comprises an outlet for a urea/carbamate stream concentrated in urea.

Between the tubes and the shell, the stripper comprises a shell-side space. A heating fluid inlet and a heating fluid outlet are in fluid connection with the shell-side space. Preferably, the heating fluid inlet is adjacently disposed to the top end of the stripper and the heating fluid outlet is adjacently disposed to the bottom end of the stripper.

The stripper has a longitudinal direction and lateral cross section. The longitudinal direction is parallel to the tubes. In other words, the longitudinal direction is the direction which connects the top end and the bottom end. The lateral cross sections are perpendicular to the longitudinal direction. In other words, the term "lateral cross section through the stripper" refers to a cross section through the stripper in a plane which is perpendicular to the tubes. Preferably, the stripper is cylindrical. In other words, the stripper preferably has a circular lateral cross section.

A plurality of baffles are arranged in the shell-side space. The baffles comprise an opening for heating fluid to pass through. They are arranged to define a tortuous flow path in the shell-side space. In other words, the baffles are arranged to define a multi-pass cross flow path in the shell-side space. The baffles are arranged consecutively, preferably evenly, along the flow path. This enhances the heat transfer between the heating fluid and the tubes.

Preferably, the openings in consecutive baffles are positioned in different locations. For example, the openings in two consecutive baffles may be provided at opposite sides.

The baffles are parallel with the lateral cross sections within a margin of error which is less than 10.0°, or less than 8.0°, or less than 6.0°. Preferably, the baffles are parallel with the lateral cross sections within a margin of error which is less than 5.0°, or less than 4.0°, or less than 3.0°, or less than 2.0°, or less than 1.0°, or less than 0.50°, or less than 0.25°, or less than 0.10°. Even more preferably, the baffles are parallel with the lateral cross sections within a margin of error which is less than 1.0°, or less than 0.50°, or less than 0.25°, or less than 0.10°.

The stripper further comprises a plurality of deflectors in the shell-side space. In particular, the deflectors and baffles are made of separate sheet metal plates. The deflectors are positioned in the flow path, and are at oblique or right angles with respect to the baffles.

The deflectors are at an oblique angle and/or at a right angle with respect to the baffles.

The strippers provided herein benefit from reduced corrosion and provide better stripping efficiency, even when they are scaled up to a very large size. Without the invention being bound by any particular theory or mode of operation, it is believed that the reduced corrosion is due to more homogeneously distributed heating fluid flow by which urea/carbamate mixture inside the tubes is heated. This mechanism is elaborated on in the examples.

In some embodiments, at least 10.0%, or at least 20.0%, or at least 30.0%, or at least 40.0%, or at least 50.0%, or at least 60.0%, or at least 70.0%, or at least 80.0%, or at least 90.0% of the deflectors are associated with a baffle. In other words, these deflectors are positioned adjacent to a baffle and are arranged to shape the flow path of the heating fluid in cooperation with that baffle.

In some embodiments, the deflectors which are associated with a baffle are smaller than the baffle they are associated with.

In some embodiments, the deflectors which are associated with a baffle have the same size as the baffle they are associated with, optionally within a margin of error of 5.0, 2.0, or 1.0 cm.

In some embodiments, the deflectors which are associated with a baffle are larger than the baffle they are associated with.

In some embodiments, the deflectors which are associated with a baffle are physically attached to the baffle they are associated with.

In some embodiments, the deflectors are positioned from the baffle they are associated with at a distance between 1.0 mm and 50.0 mm, or at a distance between 2.0 mm and 25.0 mm, or at a distance between 5.0 and 12.5 mm, or at a distance between 7.5 and 10.0 mm.

In some embodiments, the stripper comprises single segmental baffles, and each single segmental baffle is associated with at least one, preferably two deflectors. Preferably, a single segmental baffle is associated with two deflectors, one deflector upstream of the single segmental baffle and one deflector downstream of the single segmental baffle. More preferably, at least one single segmental baffle, preferably each single segmental baffle except for the outer baffles, is associated with four deflectors, two deflectors upstream of the single segmental baffle, and two deflectors downstream the single segmental baffle. The two deflectors upstream of a single segmental baffle are preferably positioned at opposite edges of the baffle. Likewise, the two deflectors downstream of a single segmental baffle are preferably positioned at opposite edges of the baffle.

Note that the term "outer baffles" is used to refer to the baffle the closest to the inlet, and the baffle the closest to the outlet.

The single segmental baffle the closest to the inlet is preferably associated with three deflectors, two deflectors downstream of that baffle, and one deflector upstream of that baffle. The deflector upstream of that baffle is preferably positioned at the far edge of the single segmental baffle with respect to the heating fluid inlet.

The single segmental baffle the closest to the outlet is preferably associated with three deflectors, two deflectors upstream of that baffle, and one deflector downstream of that baffle. The deflector downstream of that baffle is preferably positioned at the far edge of the single segmental baffle with respect to the heating fluid outlet.

As mentioned before, the stripper comprises a shell and a plurality of tubes disposed within the shell. In some embodiments, the tubes are vertically disposed within the shell. In some embodiments, the tubes have a length of more than 3.0 m, more than 4.0 m, or more than 5.0 m. In some embodiments, the tubes have a length between 4.0 and 8.0 m, or a length between 5.0 and 7.0 m. Preferably, the tubes have a length between 5.0 and 6.0 m.

The tubes preferably have an outer diameter between 20.0 and 40.0 mm.

In the case of a $CO_2$ stripper, the tubes preferably have an outer diameter between 20.0 and 40.0 mm, or between 25.0 and 35.0 mm.

In the case of a self-stripper, the tubes preferably have an outer diameter between 20.0 and 30.0 mm. In the case of a $CO_2$ stripper, the tubes preferably have an outer diameter between 30.0 and 35.0 mm.

In some embodiments, the stripper comprises more than 3000 tubes, or more than 4000 tubes, or more than 5000 tubes, or more than 6000 tubes, or more than 7000 tubes. In some embodiments, the stripper comprises 3000 to 7000 tubes, or 4000 to 6000 tubes, or 5000 to 7000 tubes, or 5000 to 10000 tubes.

Preferably, the tubes are made of stainless steel.

In a preferred mode of operation, the urea/carbamate mixture flows down as liquid film along the walls of the tubes, and the stripping gas flows upward through the centre of the tubes.

In some embodiments, the shell is cylindrical, and the shell has an outer diameter between 2.0 and 6.0 m, or between 3.0 and 5.0 m.

As mentioned before, the stripper comprises a top end and a bottom end. During normal use, the top end of the stripper is positioned at the top of the stripper, and the bottom end is positioned at the bottom of the stripper. In other words, the stripper comprises a top and a bottom. During normal use, the top end is positioned at the top of the stripper, and the bottom end is positioned at the bottom of the stripper.

The tubes are disposed between the top end and the bottom end. A tube-side space is disposed within the tubes and a shell-side space is disposed between the tubes and the shell. The top end and the bottom end are in fluid connection with the tube-side space. In other words, the top end is in fluid connection with the bottom end through the plurality of tubes disposed within the shell. The shell-side space is not in fluid connection with the top end and the bottom end. The shell-side space is separated from the top end, for example by means of a top tube sheet. The shell-side space is separated from the bottom end, for example by means of a bottom tube sheet. When the top end is separated from the shell-side space by means of a top tube sheet, the fluid connection between the tubes and the top end is provided by means of perforations in the top tube sheet. When the bottom end is separated from the shell-side space by means of a bottom tube sheet, the fluid connection between the tubes and the bottom end is provided by means of perforations in the bottom tube sheet. Preferably the perforations in the top tube sheet and in the bottom tube sheet are circular, the tubes are cylindrical, and the perforations have a diameter which equals the diameter of the tubes within a margin of error of less than 10.0%, 5.0%, 2.0%, or 1.0%.

The bottom end comprises an outlet for a urea/carbamate stream concentrated in urea. In some embodiments, this urea/carbamate stream concentrated in urea comprises unreacted ammonium carbamate, e.g. between 0.0 and 30.0 wt %, or between 10.0 and 20.0 wt %, or between 10.0 and 15.0 wt %, or between 15.0 and 25.0 wt % of ammonium carbamate.

In some embodiments, the urea/carbamate stream concentrated in urea comprises free ammonia, e.g. between 0.0 and 20.0 wt %, or between 0.5 and 1.0 wt %, or between 0.5 and 20 wt %, or between 10 and 15 wt % of free ammonia.

In some embodiments, the urea/carbamate stream concentrated in urea comprises both free ammonia and ammonium carbamate, for example in the above-specified concentrations.

In some embodiments, the angle between the baffles and the deflectors is at least 45°. In particular, the angle between the baffles and the deflectors is between 45.0° and 90.0°, or between 50.0° and 85.0°, or between 55.0° and 80.0°, or between 60.0° and 75.0°, or between 65.0° and 70.0° with the baffles. Even more in particular, the angle between the baffles and the deflector is between 45.0° and 90.0°.

It shall be understood that the above description of the deflectors in conjunction with baffles applies to the configuration in the centre stages of the stripper, i.e. between the stripper's top end and bottom end. At the stripper's top end, the deflector configurations near the steam belt distributor preferably apply. These configurations are described elsewhere herein.

In some embodiments, the deflectors are arched.

In some embodiments, the deflectors describe an arc, for example an arc between 0.0° and 5.0°, or between 5.0° and 15.0°, or between 15.0° and 30.0.

In some embodiments, the deflectors describe an arc between 0.0° and 5.0°, or between 5.0° and 15.0°, or between 15.0° and 30.0 along a cross section through the shell-and-tube stripper which is parallel to the longitudinal direction.

In some embodiments, the deflectors describe an arc in three dimensions. In other words, in some embodiments, the deflectors have three dimensional curvature. Preferably, the deflectors describe an arc which is smaller than 30.0°.

In some embodiments, the deflectors describe an arc between 0.0° and 5.0°, or between 5.0° and 15.0°, or between 15.0° and 30.0 along a lateral cross section through the shell-and-tube stripper.

In some embodiments, the deflectors are planar. In other words, in some embodiments the deflectors have zero curvature. In some embodiments, the deflectors are curved. In some embodiments, the deflectors are convex. In some embodiments, the deflectors are concave.

The deflectors and the baffles can be said to cooperate to homogenise the flow of heating fluid in the shell-side space.

In some embodiments, the deflectors are perforated.

In some embodiments, the baffles are perforated.

In some embodiments, the perforations are circular.

In other words, in some embodiments the deflectors and/or the baffles comprise a plurality of perforations. In some embodiments, at least some perforations in the baffles are circular to accommodate the tubes. In some embodiments, all perforations are circular. Preferably, the perforations have a diameter which is larger than the outer diameter of the tubes. For example, the perforations have a diameter which is 1.0% to 10.0% larger, or 2.0 to 5.0%, or 1.0 to 3.0% larger than the diameter of the tubes. In these embodiments, the number of perforations in a deflector or baffle is preferably equal to or greater than the number of tubes that pass through that deflector or baffle. It shall be understood that deflectors are distinct components from the tubes, and are arranged in the shell-side space between the tubes. Generally speaking, deflectors and baffles comprise a sheet of metal and may be either perforated or not. The sheet of metals associated to the baffles is flat and the sheet of metals associated to deflectors are flat or bent. Conversely, the tubes are tubular structures and are closed. In other words, tubes are not perforated.

Preferably, the perforations through the deflector baffles are elliptical. Such perforations are well-suited to accommodate vertically arranged tubes through obliquely arranged deflectors. In some embodiments, the baffles are evenly spaced, i.e. the distance between adjacent baffles in the longitudinal direction of the stripper is constant within a margin of error of 25.0%, 15.0%, 10.0%, 5.0%, 1.0%, or 0.50%. In some embodiments, the perforations in the baffles have a uniform size within a margin of error of 25.0%, 15.0%, 10.0%, 5.0%, 2.0%, or 1.0%.

In some embodiments, the space between any tube and the perforation through which it protrudes a baffle or deflector is less than 1.0%, 2.0%, 3.0%, 5.0%, or 10.0% of the diameter of the tube. In some embodiments, the space between any tube and the perforation through which it protrudes a baffle or deflector is between 0.0% and 1.0%, or between 1.0% and 2.0%, or between 2.0% and 3.0%, or between 3.0% and 5.0%, or between 5.0% and 10.0%, or between 0.5% and 1.5%, or between 1.5% and 2.5%, or between 2.5% and 3.5%, or between 3.5% and 5.5%, or between 5.5% and 10.5% of the diameter of the tube.

Accordingly, the shape of the perforations closely conforms to the edge of the tubes which protrude through the baffles. Where needed, the size margin between the tube and the edge of the perforation to allow for accommodating thermal strain in the stripper.

In some embodiments, the size of the perforations in a deflector is larger near its top end than near its bottom end.

In some embodiments, each baffle has a number of perforations which equals the number of tubes that pass through that baffle. In these embodiments, the baffles are closed between the tubes.

In some embodiments, each deflector has two types of perforations: one type of perforations through which tubes pass, and another type of perforations through which heating fluid can pass. In some embodiments, the perforations in the deflectors through which heating fluid passes have a varying size. The varying size of these perforations allows equalizing the pressure drop over the deflectors.

In some embodiments, the baffles are segmental baffles. Segmental baffles as such are known in the art, and comprise single segmental baffles and double segmental baffles. The segmental baffles are preferably perpendicular to the longitudinal direction within a margin of error of less than 10.0%, or less than 5.0%, or less than 2.0%, or less than 1.0%.

Single segmental baffles can be described as baffles which comprise an opening at one end and are otherwise closed, except possibly for the presence of perforations. For the case of strippers with a circular lateral cross section, the single segmental baffle is shaped as a circular segment. The circular segment has a chord.

Also, the single segmental baffles are consecutively positioned along the longitudinal direction of the shell-and-tube stripper and their orientation varies along the longitudinal direction of the shell-and-tube stripper. A deflector is positioned between adjacent single segmental baffles. Preferably, the deflectors are positioned at the edge of the single segmental baffles.

In some embodiments, a deflector is positioned adjacent to the opening of a single segmental baffle. In some embodiments, a deflector is positioned adjacent to the chord of a single segmental baffle. In other words, in these embodiments, a deflector is positioned adjacent to the edge of the single segmental baffle it is associated with. In other words, in these embodiments a deflector is positioned parallel to the chord of the single segmental baffle, and at a distance from the opening or chord of the segmental baffle of less than 10.0%, or less than 5.0%, or less than 1.0% of the characteristic size of the baffle. When the single segmental baffle is shaped as a circular segment, its characteristic size corresponds to its diameter.

In some embodiments, the baffles are disk-and-doughnut baffles comprising disk baffles and doughnut baffles. Each disk baffle is shaped as a disk. Each doughnut baffle is shaped as a ring which comprises a hole. In some embodiments, diameter of the disk baffles is equal to the diameter of the hole in the doughnut baffles within a margin of error of less than 10.0%, or less than 5.0%, or less than 2.0%, or less than 1.0%. In some embodiments, the diameter of the disk baffles is larger than the hole in the doughnut baffles by 1.0% to 30.0%, or 2.0% to 15.0%, or 5.0% to 10.0%. The disk baffles and the doughnut baffles being alternatingly positioned along the longitudinal direction of the shell-and-tube stripper. Deflectors are positioned between adjacent disk baffles and doughnut baffles.

In some embodiments, the deflector baffles are positioned at a distance from the edge of the hole in the doughnut baffles which is less than 10.0%, or less than 5.0%, or less than 2.0%, or less than 1.0% of the outer diameter of the doughnut baffles.

In some embodiments, the diameter of the central hole of the ring-shaped baffles is smaller than the diameter of the disk-shaped baffles.

The disk-and-doughnut baffles are preferably perpendicular to the longitudinal direction within a margin of error of less than 10.0%, or less than 5.0%, or less than 2.0%, or less than 1.0%.

In some embodiments, and adjacent to the disk baffles, the deflectors have a circular cross section in a plane which is parallel to the disk baffles. In other words, in some embodiments, and adjacent to the disk baffles, the deflector baffles have a circular cross section when viewed from the top of the stripper. Preferably, the diameter of deflectors in this cross section is 1.0% to 50.0%, or 2.0% to 25.0%, or 5.0% to 10.0% smaller than the diameter of the corresponding disk baffle.

In some embodiments, the deflectors between the disk-and-doughnut baffles are made up of a plurality of distinct parts.

In some embodiments, the doughnut baffles are plates shaped as convex polygon that comprises 5 or more sides and that comprises a hole shaped as a convex polygon. In other words, in some embodiments, and adjacent to the disk baffles, the deflector baffles have a circular cross section when viewed from the top of the stripper. In some embodiments, the disk baffles are shaped as a solid, i.e. not comprising any holes, convex polygonal plate, except for any holes that are required for the passage of tubes.

Preferably a disk baffle is associated with two deflectors, one deflector upstream of the disk baffle and one disk baffle downstream of the disk baffle. Preferably, the deflectors extend from the edge of a disk baffle to the edge of an adjacent doughnut baffle. Accordingly, deflectors are each associated with a disk baffle and a doughnut baffle.

Upstream is the direction towards the heating fluid inlet. Downstream is the direction towards the heating fluid outlet.

In some embodiments, the baffles are double segmental baffles. The double segmental baffles comprise outer baffles and inner baffles. Each outer baffle is shaped as a circular segment, i.e. a region of a circle delineated by the circle's edge and a chord. The outer baffles are arranged in pairs of two baffles being arranged on opposing sides of a lateral cross section through the shell-and-tube stripper. The inner baffles are preferably shaped as a mirror symmetrical area between two circle segments which have parallel chords. In particular, the inner baffles are preferably positioned between the outer baffles, as seen from the top of the stripper. Two outer baffles and an inner baffle are perpendicular to the longitudinal direction within a margin of error of less than 10.0%, or less than 5.0%, or less than 2.0%, or less than 1.0%. Also, they are consecutively and alternatingly positioned along the longitudinal direction of the shell-and-tube stripper. The deflectors are positioned between consecutive inner baffles and outer baffles.

In some embodiments, the spacing between two outer baffles in the same lateral cross section is equal to the width of the inner baffle within a margin of error of less than 10.0%, or less than 5.0%, or less than 2.0%, or less than 1.0%. In some embodiments, the width of the inner baffles is larger than the spacing between the outer baffles by 1.0% to 30.0%, or 2.0% to 20.0%, or 5.0% to 15.0%, or 8.0% to 10.0%. The inner baffles and the outer baffles are alternatingly positioned along the longitudinal direction of the shell-and-tube stripper.

Deflectors are positioned between adjacent inner baffles and outer baffles.

These baffle configurations are effective at reducing the amount of corrosion in the tubes of shell-and-tube strippers used for urea-carbamate decomposition. This is especially the case for big (sizeable) strippers.

Preferably an inner baffle is associated with four deflectors, two deflectors at each edge; two deflectors upstream of the inner baffle and two deflectors downstream of the inner baffle. Preferably, an outer baffle is associated with two deflectors, one deflector upstream of the outer baffle and one deflector downstream of the outer baffle. The deflectors associated with an inner baffle extend to adjacent outer baffles. Similarly, the deflectors associated with an outer baffle extend to adjacent inner baffles. From the above, it follows that the deflectors are associated with one inner baffle and one outer baffle each.

In some embodiments, the deflectors comprise perforations with a varying size. Preferably, the diameter of the perforations in the deflectors varies from 1.0% to 50.0%, from 2.0% to 25.0%, or from 5.0% to 10.0% between the deflector edge the closest to an associated outer baffle and the deflector edge the closest to an associated inner baffle. For example, the perforations are larger towards the corresponding outer baffle and smaller towards the corresponding inner baffle. Alternatively, the perforations can be smaller towards the corresponding outer baffle and larger towards the corresponding inner baffle.

In some embodiments, segmented equalization baffles are provided between the inner baffles and the shell of the stripper. The segmented equalization baffles are perforated to allow for the passage of steam. Preferably, the segmented equalization baffles comprise perforations with a varying diameter. Preferably, the perforations have a larger diameter the closer they are to the shell. In some embodiments, the diameter of the perforations in the segmented equalization baffles varies from 1.0% to 50.0%, from 2.0% to 25.0%, or from 5.0% to 10.0% between the edge of the segmented equalization baffle the closest to the corresponding baffle and the edge of the segmented equalization baffle the closest to the shell.

It shall be understood that the above description of the deflectors in conjunction with single segmental, double segmental, and disk-and-doughnut baffles applies to the configuration in the centre stages of the stripper, i.e. between the stripper's top end and bottom end. At the stripper's top end, the deflector configurations near the steam belt distributor preferably apply. These configurations are described elsewhere herein.

In some embodiments, the top end of the stripper is connected to the tubes by means of ferrules in a top tube sheet. Each ferrule is a liquid divider and is coupled with the tubes. The ferrules are configured to evenly distribute a urea/carbamate mixture through each tube via holes in the ferrule. Preferably, the holes are provided in the bottom part of the ferrule.

Also, the ferrules comprise one or more holes, preferably in their top part, which allow releasing gas flow to the top end of the stripper.

In some embodiments, the stripper comprises more than 3000 tubes, or more than 4000 tubes, or more than 5000 tubes, or more than 6000 tubes, or more than 7000 tubes.

In some embodiments, the shell is cylindrical, and wherein the shell has an outer diameter between 2.0 and 6.0 m, or between 3.0 and 5.0 m.

In some embodiments, the stripper further comprises two heating fluid inlets: a first heating fluid inlet and a second heating fluid inlet. Both the first heating fluid inlet and the second heating fluid inlet are in fluid connection with the shell-side space.

Preferably, the second heating fluid inlet is installed between the first heating fluid inlet and the heating fluid outlet.

In some embodiments, the first heating fluid inlet is adjacently disposed to the top end of the stripper and the heating fluid outlet is adjacently disposed to the rear end of the stripper.

In some embodiments, the second heating fluid inlet is positioned at a distance from the top end of the stripper that equals 35.0 to 75.0%, or 35.0 to 70.0%, or 35.0 to 65.0%, or 40.0 to 60.0% of the distance between the top end and the bottom end of the stripper; or, the second heating fluid inlet is positioned at a distance from the bottom end of the stripper that equals 35.0 to 75.0%, or 35.0 to 70.0%, or 35.0 to 65.0%, or 40.0 to 60.0% of the distance between the top end and the bottom end of the stripper.

In some embodiments, the stripper comprises more than two heating fluid inlets. The more than two heating fluid inlets comprise the first heating fluid inlet, the second heating fluid inlet, and one or more further heating fluid inlets, the one or more further heating fluid inlets being positioned between the first heating fluid inlet and the heating fluid outlet.

In some embodiments, the first heating fluid inlet is adjacently disposed to the top end of the stripper, and the heating fluid outlet is adjacently disposed to the bottom end of the stripper. In other words, the first heating fluid inlet is preferably disposed at a distance from the top end of the stripper which is smaller than 20%, or 10.0%, or 5.0%, or 1.0% of the distance between the front and bottom ends of the stripper; and the heating fluid outlet is preferably disposed at a distance from the bottom end of the stripper which is smaller than 20%, or 10.0%, or 5.0%, or 1.0% of the distance between the front and bottom ends of the stripper.

The second heating fluid inlet is disposed between the first heating fluid inlet and the heating fluid outlet. In other words, the first heating fluid inlet is preferably disposed at a distance from the bottom end of the stripper which is smaller than 20%, or 10.0%, or 5.0%, or 1.0% of the distance between the front and bottom ends of the stripper; and the heating fluid outlet is preferably disposed at a distance from the top end of the stripper which is smaller than 20.0%, 15.0%, 10.0%, or 5.0%, or 1.0% of the distance between the front and bottom ends of the stripper.

However, preferably, the first heating fluid inlet is adjacently disposed to the top end of the stripper and the heating fluid is adjacently disposed to the bottom end of the stripper. In this way, steam condensate can be easily and efficiently removed from the shell-space side.

In some embodiments, the second heating fluid inlet is positioned at a distance from the top end of the stripper that equals 40.0 to 75.0% of the distance between the top end and the bottom end of the stripper. In some embodiments, the second heating fluid is positioned at a distance from the top end of the stripper that equals 35.0 to 75.0%, or 35.0 to 70.0%, or 35.0 to 65.0%, or 40.0 to 60.0% of the distance between the top end and the bottom end of the stripper.

In some embodiments, the second heating fluid inlet is positioned at a distance from the bottom end of the stripper that equals 40.0 to 75.0% of the distance between the top end and the bottom end of the stripper. In some embodiments, the second heating fluid is positioned at a distance from the bottom end of the stripper that equals 35.0 to 75.0%, or 35.0 to 70.0%, or 35.0 to 65.0%, or 40.0 to 60.0% of the distance between the top end and the bottom end of the stripper.

This further improves the homogeneity of the heat distributed to the tubes, which in turn reduces the occurrence of corrosion-related issues and improves the stripping efficiency.

In some embodiments, the stripper comprises more than two heating fluid inlets: the first heating fluid inlet, the second heating fluid inlet, and one or more further heating fluid inlets. The one or more further heating fluid inlets are positioned between the first heating fluid inlet and the heating fluid outlet.

In some embodiments, the stripper comprises one or more groups of heating fluid inlets. A group of heating fluid inlets consists of two or more heating fluid inlets which are positioned at the same longitudinal position in the stripper. The expression "longitudinal position in the stripper" refers to the position in the direction along which the tubes are positioned. During normal operation, the stripper is positioned upright and the tubes are arranged vertically, such that the longitudinal position of a steam inlet in the stripper corresponds to the height at which the steam inlet is positioned.

When objects are said to be vertically oriented, reference is made to the orientation of their longitudinal axis. It shall be understood that this orientation may have a certain deviation from the vertical axis. Preferably, this deviation is less than 1.0°, or less than 0.5°. More preferably, the deviation is less than 0.1°.

In some embodiments, the first heating fluid inlet is replaced by a first group of heating fluid inlets.

In some embodiments, the second heating fluid inlet is replaced by a second group of heating fluid inlets.

In some embodiments, the heating fluid outlet is replaced by a group of heating fluid outlets.

In some embodiments, the stripper comprises two or more groups of heating fluid inlets positioned between the first group of heating fluid inlets and the group of heating fluid outlets, for example 3, 4, 5, 6, 7, or 8 groups of heating fluid inlets.

In some embodiments, the heating fluid inlets, or the groups of heating fluid inlets, are evenly spaced. The term "evenly spaced" indicates that the distances between adjacent heating fluid inlets or groups of heating fluid inlets deviate less than 20.0%, less than 10.0%, less than 5.0%, less than 1.0%, or less than 0.10% from the average distance between adjacent heating fluid inlets.

These particular arrangements of heating fluid inlets and/or outlets further improve the homogeneity by which heat is provided to the tubes.

In some embodiments, the stripper comprises a steam belt distributor and an inlet deflector.

These additional design features homogenize the flow of steam near a steam inlet. The steam belt distributor forms a belt-shaped space between the stripper's shell and the steam belt distributor. The belt-shaped space is an annular space between the steam belt distributor and the shell. A steam belt distributor can be used with any type of baffles.

In some embodiments, the steam belt distributor is shaped as an open cylinder with two or more openings, for example three openings, in its side. In some embodiments, the steam belt distributor is an open circular cylinder. The expression "open cylinder" as used herein denotes a cylinder of which the base and top planes are open.

Preferably, the steam belt distributor is made out of sheet metal, for example a steel sheet.

In some embodiments, the steam belt distributor comprises three openings in its side: a central opening and two side openings. In these embodiments, the inlet deflector is aligned with the central opening and serves to further homogenise heating fluid that enters the shell-side space through the belt-shaped space.

In some embodiments, the inlet deflector is positioned symmetrically around a plane that is perpendicular to the baffles, and passes through the center of the heating fluid inlet and the central opening.

In some embodiments, the deflector is shaped as a circle sector, or is elliptical, or is flat. In some embodiments, the inlet deflector is curved. Preferably, the inlet deflector is curved in the direction of the central opening. In some embodiments, the inlet deflector comprises openings, e.g. perforations. Preferably, the openings in the inlet deflector are smaller near the symmetry plane and become larger moving away from the symmetry plane, for example by 1.0% to 50.0%, or 2.0% to 25.0%, or 5.0% to 10.0%. In some embodiments, the steam belt distributor is perforated. In some embodiments, the inlet deflector is perforated.

In some embodiments, the steam belt distributor comprises a plurality of openings or perforations. The openings may be, for example, rectangular or circular. For example, the steam belt distributor comprises from 2 to 1000 openings, for example from 5 to 500 openings, or from 10 to 250 openings, or from 50 to 225 openings, or from 100 to 200 openings, or from 150 to 175 openings.

In some embodiments, the total area of the openings or perforations in the steam belt distributor equals 2 to 8 times, or 3 to 6 times, or 4 times the total area of the corresponding heating fluid inlet.

In some embodiments, the steam belt distributor comprises a perforated area and a non-perforated area. In the non-perforated area, the steam belt distributor is closed. The perforated area is adjacently disposed next to the heating fluid inlet. Consequently, the non-perforated area is positioned away from the heating fluid inlet. In these embodiments, and for the case of single segmental battles, a plurality of deflectors is preferably disposed adjacent to the edge of the single segmental baffle which is positioned the closest to the heating fluid inlet. Preferably, these deflectors are symmetrically arranged around a vertical central plane passing through the steam inlet and the closed area in the steam belt distributor. Preferably, these deflectors are obliquely arranged with respect to one another, for example, the angle between adjacent deflectors is between 1.0° and 50.0°, or 2.0° to 45.0°, or 5.0° to 30.0°, or 10.0° to 25.0°, or 15.0° to 20.0°. These deflectors can be curved or planar. Preferably, they are curved.

The steam belt distributor and the one or more associated distributors homogenise the steam flow near the heating fluid inlet. In addition, a steam belt distributor reduces the speed of the steam flow as it impinges on the tubes in the stripper, thereby reducing tube erosion.

Further provided herein is a stripper comprising a steam belt distributor and one or more inlet deflectors for homogenizing steam being provided from a steam inlet. The steam belt distributor and one or more inlet deflectors were described above. The stripper may or may not comprise baffles. Preferably, the stripper comprises single segmental, double segmental, or disk-and-doughnut baffles. Preferably, the steam belt distributor and one or more deflectors are used in conjunction with a stripper comprising single segmental baffles. The baffles may or may not be associated with deflectors of their own. Preferably, the stripper comprises deflectors which are associated with the baffles as described above.

Further provided herein is a system for the production of urea. The system comprises a carbamate condenser, a urea reactor, and a stripper.

The stripper is a shell-and-tube stripper and has been described above. In particular, the stripper may be a $CO_2$ stripper or a self-stripper as described above.

In some embodiments, the urea reactor and the carbamate condenser are separate reactor vessels. Alternatively, the urea reactor and the carbamate condenser are realised as an integrated urea reactor and the carbamate condenser. These two embodiments are discussed separately.

When the carbamate condenser and the urea reactor are separate reactor vessels, the carbamate condenser is arranged to partially and exothermically transform ammonia and carbon dioxide into ammonium carbamate, and the carbamate condenser partially converts the thusly formed ammonium carbamate to urea. Thus, a condenser effluent is obtained.

The urea reactor is arranged to adiabatically convert at least a part of the ammonium carbamate in the condenser effluent into urea. Thus, a urea/carbamate mixture is obtained.

The system is arranged to provide the urea/carbamate mixture to the stripper. The stripper is arranged to convert the urea/carbamate mixture into a urea/carbamate stream concentrated in urea and a gaseous stream comprising carbon dioxide and ammonia.

When the system comprises a combined reactor that serves both as carbamate condenser and urea reactor, the combined reactor is arranged to partially and exothermally transform ammonia and carbon dioxide to ammonium carbamate. In addition, the combined reactor is further arranged to partially convert the ammonium carbamate into urea. Thus, a urea/carbamate mixture is obtained. The system is arranged to provide the urea/carbamate mixture to the stripper and the stripper is arranged to convert the urea/carbamate mixture into a urea/carbamate stream concentrated in urea and a gaseous stream comprising carbon dioxide and ammonia.

Further provided is the use of a stripper as described above for stripping a urea-carbamate mixture.

Further provided is the use of a stripper as described above for improving the stripping efficiency and/or for reducing tube corrosion while stripping urea/carbamate mixtures.

Further provided is a method for stripping a urea/carbamate mixture. Additionally or alternatively, this method can be stated to be a method for reducing corrosion in tubes of strippers for decomposing urea/carbamate mixtures and/or for improving stripping efficiency when stripping urea/carbamate mixtures.

The method comprises the step of providing a stripper. The stripper is a stripper as described above. Preferably, the stripper is positioned such that the tubes are disposed vertically within the shell. Also, the stripper is preferably positioned such that the top end is on top of the stripper, and the bottom end is at the bottom of the stripper. The urea/carbamate mixture is provided to the inlet for the urea/carbamate mixture.

When a $CO_2$ stripper is used, a stripping gas (i.e. $CO_2$), is provided to the inlet for the stripping gas. When a self-stripper is used, $CO_2$ and $NH_3$ formed during the decomposition of ammonium carbamate serve as the stripping gas. Note that as mentioned above, self-strippers do typically comprise an inlet for passivating air for the purpose of corrosion reduction, but the flow rates of passivating air are insufficient to contribute to the stripping process in a meaningful way.

A heating fluid is provided to the shell-side space by means of a heating fluid inlet. The urea/carbamate mixture and the stripping gas are contacted in the tubes. In particular, the urea/carbamate mixture flows as a falling film along the inner walls of the tubes. The stripping gas flows upward in the tube-side space.

The urea/carbamate mixture is heated by means of the heating fluid. Under influence of heat provided by the heating fluid, ammonium carbamate in the urea/carbamate decomposes to form gaseous ammonia and carbon dioxide. As ammonium carbamate in the urea/carbamate mixture decomposes a urea/carbamate stream concentrated in urea is obtained. The urea/carbamate stream concentrated in urea is extracted at the outlet for the urea/carbamate stream concentrated in urea.

A gas mixture comprising the one or more stripped compounds is extracted at the outlet for the gas mixture. When a $CO_2$ stripper is used, this gas mixture comprises the stripping gas as well. The heating fluid is extracted from the shell-side space by means of a heating fluid outlet.

These methods effectively allow better stripping urea/carbamate mixtures while reducing corrosion of strippers.

In some embodiments, the temperature of the tubes is constant along any lateral cross section through the stripper. In some embodiments, the temperature of the tubes is constant along any lateral cross section through the stripper within a margin of error of less than 10° C., less than 5° C., less than 2° C., or less than 1° C. A constant temperature along lateral cross sections through the stripper ensures uniform heat transfer to the tubes. The radially constant temperatures are caused by improved heating fluid distribution and in turn the radially constant temperatures reduce corrosion of the stripper's tubes.

In some embodiments, the pressure in the shell-side space is between 10.0 and 30.0 bar g, preferably between 16.0 and 24.0 bar g.

The mass flow rate of the heating fluid depends on the capacity of the stripper. In some embodiments, the mass flow rate of the heating fluid is between 10.0 and 60.0 kg/s, between 20.0 and 50.0 kg/s, or between 30.0 and 40.0 kg/s.

In some embodiments, the heating fluid comprises steam. Preferably, the heating fluid essentially consists of steam. In other words, the heating fluid preferably comprises at least 99.0 wt % steam, or at least 99.9 wt % steam. The symbol wt % indicates that the composition of the heating fluid is expressed as a weight percentage, i.e. as the ratio in percent of the mass flow rate of steam comprised in the heating fluid and the mass flow rate of the entire heating fluid.

In some embodiments, the heating fluid has a density between 7.0 and 13.0 kg/m³, or between 8.5 and 12.0 kg/m³.

EXAMPLES

Example 1

In a first example, reference is made to FIG. 1 which shows a stripper (100) as provided herein. In particular, the stripper (100) is a $CO_2$ stripper. The stripper (100) comprises a shell (160) and a plurality of tubes (150) which are disposed within the shell (160). Also, the stripper (100) comprises a top end (110) and a bottom end (120). The tubes (150) are disposed between the top end (110) and the bottom end (120). A tube-side space (140) is disposed within the tubes (150). A shell-side space (130) is disposed between the tubes (150) and the shell (160). The shell-side space (130) is separated from the top end (110) and the bottom end (120). The top end (110) and the bottom end (120) are in fluid connection with the tube-side space (140). Baffles are used in conjunction with deflectors in order to heat the tubes (150) more evenly.

The bottom end (120) comprises an outlet (122) for a urea/carbamate stream concentrated in urea and an inlet (121) for a stripping gas.

The top end (110) comprises an inlet (111) for a urea/carbamate mixture and an outlet (112) for a gas mixture that comprises the stripping gas and one or more stripped compounds.

The stripper (100) further comprises a heating fluid inlet (131) and a heating fluid outlet (133). The heating fluid inlet (131) and the heating fluid outlet (133) are in fluid connection with the shell-side space (130). Also, the heating fluid inlet (131) is adjacent to the top end (110) of the stripper (100). The heating fluid outlet (133) is adjacent to the bottom end (120) of the stripper (100).

The tubes (150) have a length of 6.0 m and an outer diameter of 31.0 mm. The stripper has a cylindrical shell with a diameter of 3.1 m.

Any type of baffles (segmented, double segmented, or disc-and-doughnut) can be used in the stripper of example 2, provided that they are used in conjunction with deflectors as described herein.

Figure 17:
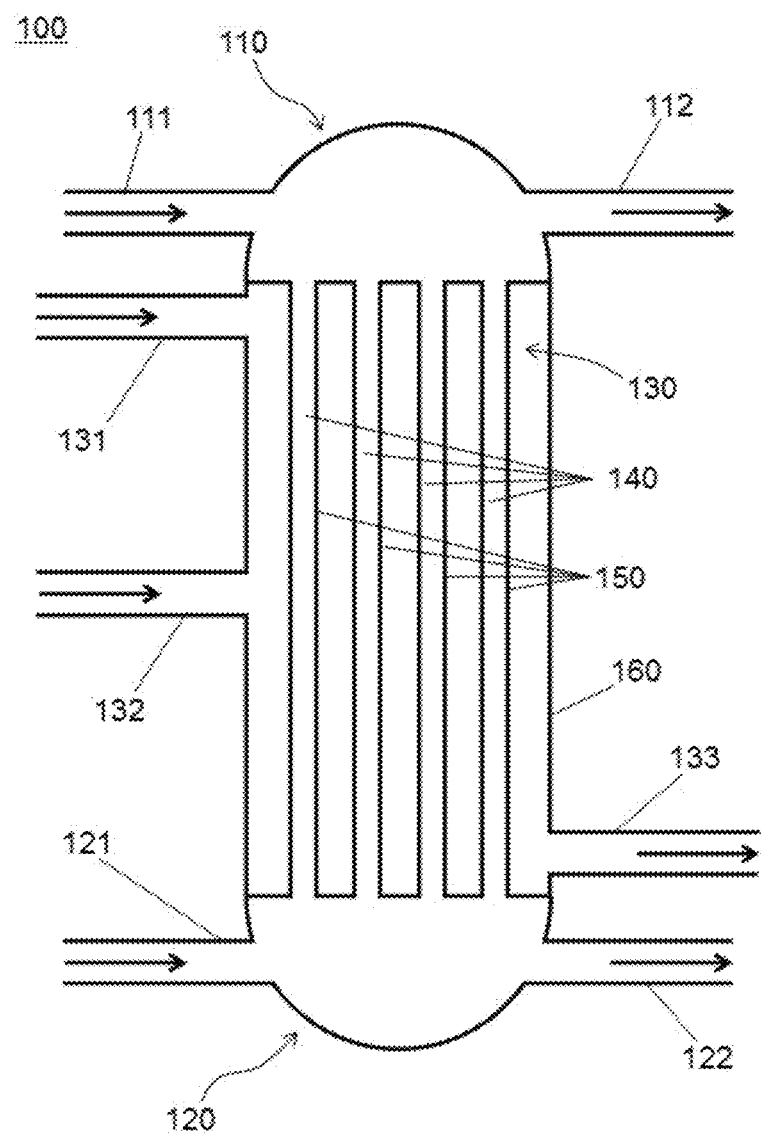
FIG. 17 shows an embodiment of a $CO_2$ stripper with two heating fluid inlets.

Optionally, the stripper according to the present example comprises two or more heating fluid inlets as described herein, such a stripper comprising both a first heating fluid inlet (131) and a second heating fluid inlet (132) is shown in FIG. 17.

Example 2

Figure 2:
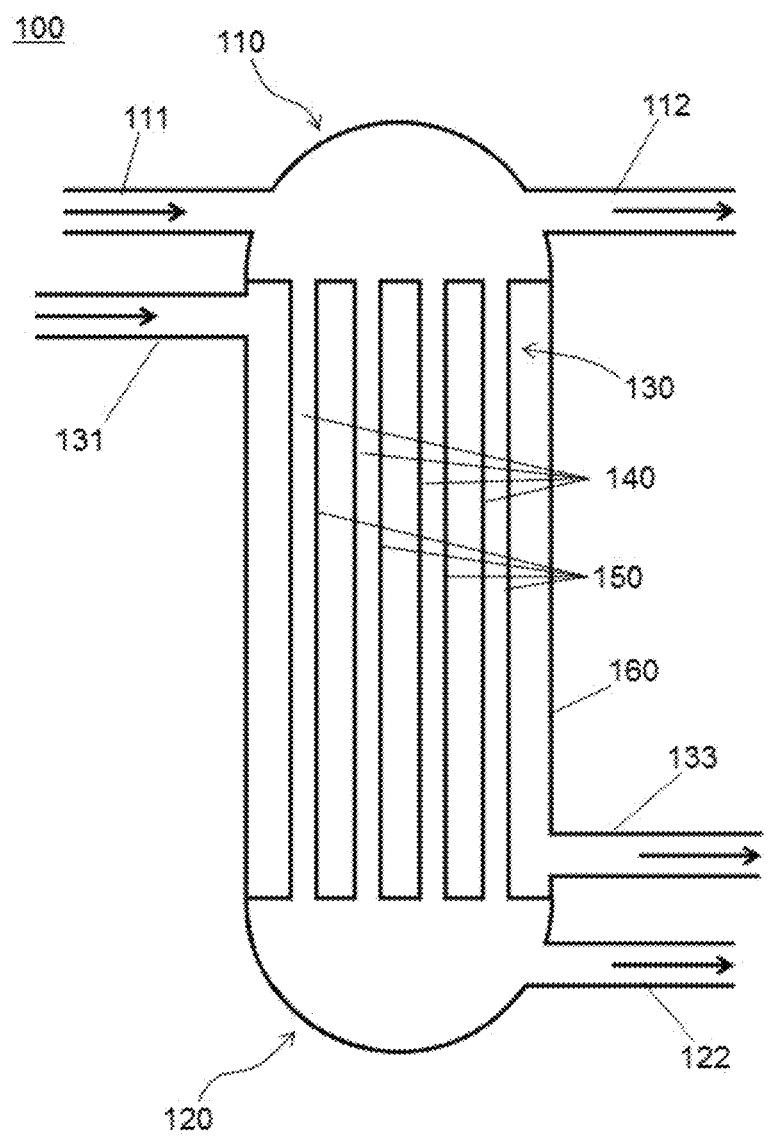
FIG. 2 shows an embodiment of a self-stripper (100).

In a second example, reference is made to FIG. 2 which shows a stripper (100) as provided herein. In particular, the stripper (100) is a self-stripper. The construction of the stripper (100) is similar to that of example 1 with a few differences.

In particular, the self-stripper does not comprise a stripping gas inlet at its bottom end: $NH_3$ and $CO_2$ formed during the decomposition of ammonium carbamate serve as the stripping gas in self-strippers such that there is no need for a stripping gas inlet.

Also, the tubes of the self-stripper are thinner than those of the $CO_2$ stripper of example 1.

In particular, the tubes of the self-stripper have an outer diameter of 25 mm.

Any type of baffles (segmented, double segmented, or disc-and-doughnut) can be used in the stripper of example 2, provided that they are used in conjunction with deflectors as described herein.

Optionally, the stripper according to the present example comprises two or more heating fluid inlets as described herein.

Example 3

Figure 3:
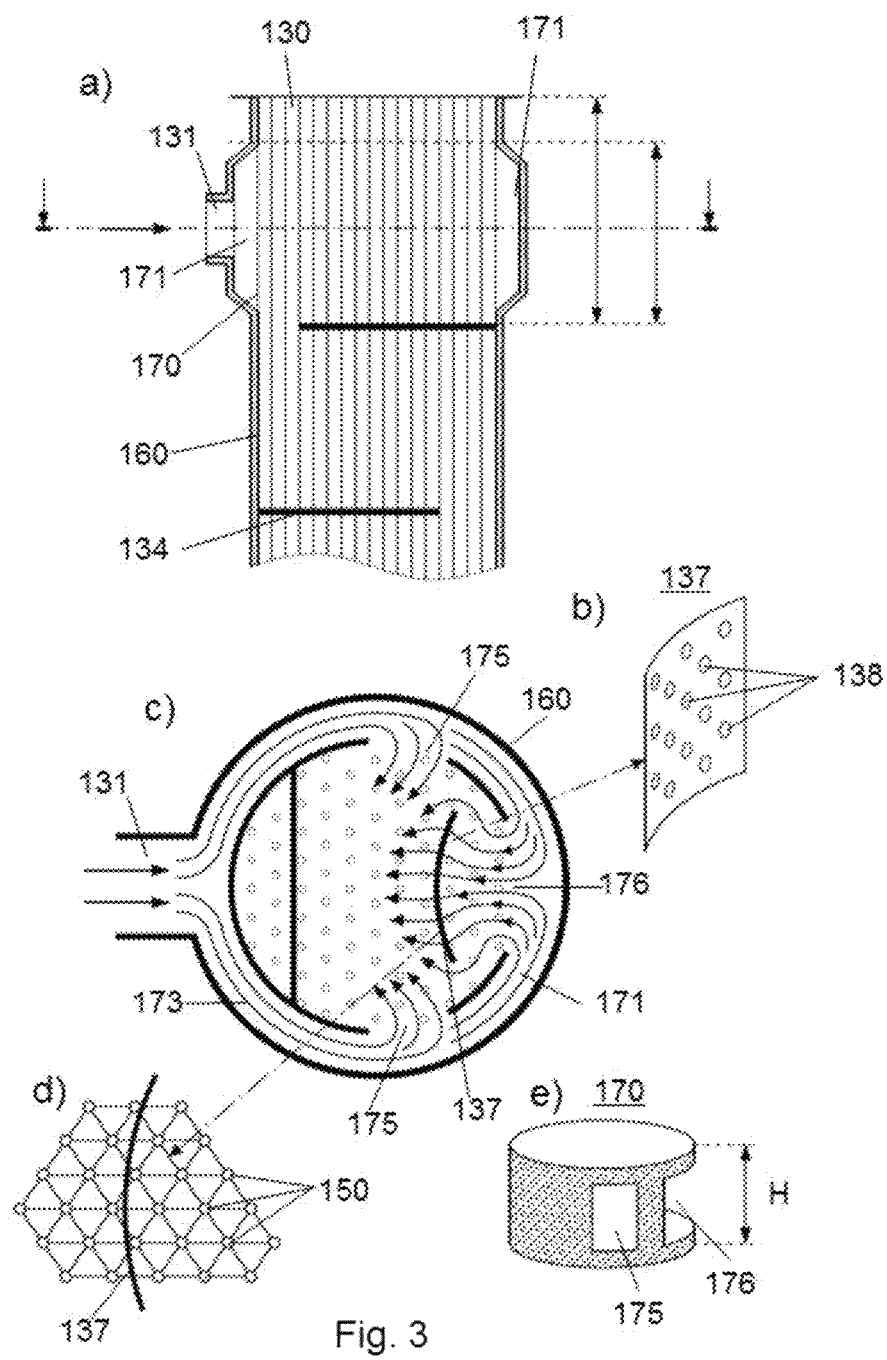
FIGS. 3 and 4 show the joint functioning of an embodiment of a belt distributor and an embodiment of guide baffles for homogenizing steam near a steam inlet.
Figure 4:
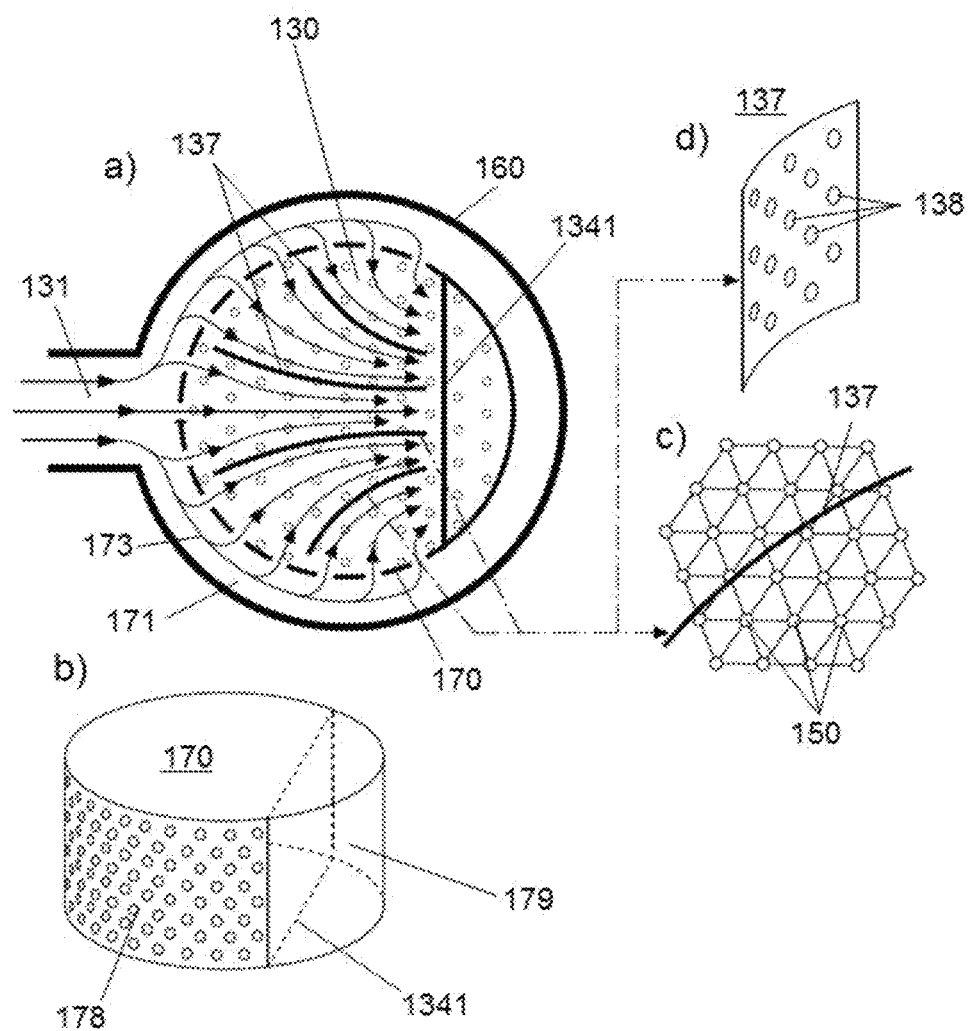

In a third example, reference is made to FIGS. 3 and 4. FIG. 3 has 5 panels a) to e) showing the joint functioning of a belt distributor and a deflector for homogenizing steam near a steam inlet in the case of single segmental baffles. In strippers with a single segmental baffle configuration a belt is normally installed to avoid that the entire flow of steam, which enters through the heating fluid inlet (131), impinges directly onto the first line of tubes in front of the heating fluid inlet (131). In the strippers according to the present example, the heating fluid inlet (131) is a nozzle through which steam enters the shell-side space (130) at a high velocity. Such high velocity steam causes tube erosion.

The steam belt distributor (170) of the present example comprises several slots (175,176), the total area of which is twice the area of the steam inlet (131). In this case, the steam's specific kinetic energy $(½)\rho v^2$ is reduced by 75%.

Specifically referring to FIG. 3, panel a) shows a cross-section through a stripper near the steam inlet, panel b) shows a close-up view of a deflector plate (137), panel c) shows a cross section of a stripper at a steam inlet. The cross section shown in panel c) is perpendicular to the cross section shown in panel a). Panel e) shows a perspective view of a steam belt distributor (170).

Steam enters the shell-side space (130) of the stripper through a heating fluid inlet (131). In entering the shell-side space (130), the steam first enters a belt-shaped space (171) formed between the stripper's shell (160) a steam belt distributor (170). The belt-shaped space (171) is an annular space between the steam belt distributor and the shell. The steam belt distributor (170) is a metal sheet shaped as an open cylinder with three openings (175,176) on its side.

Referring to panels a) and c), steam enters through the heating fluid inlet (131) at the left hand side of the stripper, and it enters the belt-shaped space (171). In the left-hand side of the belt-shaped space (171), the steam belt distributor (170) is closed, i.e. it does not comprise any openings such that steam entering the belt-shaped space is forced to flow to the right-hand side of the belt-shaped space (171) where the belt distributor (170) comprises three openings (175,176): two side openings and a centre opening. Steam flows through the openings (172) into the bulk of the shell-side space (130).

In front of the central opening (176), a deflector (137) is positioned. It is positioned symmetrically around a plane that is perpendicular to the baffles, and passes through the centers of the heating fluid inlet (131) and the central opening (176). The deflector can be a section of circle, elliptical or flat. If curved, curvature can be oriented in any direction but ideally towards the central opening (see FIG. 3c). The deflector (137) is perforated, i.e. it comprises perforations (138). Ideally, the perforations are smaller near the symmetry plane and become larger moving away from the symmetry plane. The deflector forms an obstruction against steam flow which homogenizes the horizontal flow of steam through the shell-side space (130) such that the tubes (150) near the steam inlet (131) are heated more homogeneously. In addition, through improved distribution of the steam, the velocity of steam that impinges on the tubes is reduced such that tube erosion is reduced as well.

Nevertheless, further improvements can be made regarding the homogeneity of steam flow distribution. The homogeneity of the steam flow can be further improved, for example by providing 175 slots with a small area each instead of just three slots with a larger area.

Alternatively, the steam belt distributor (170) for use with single segmental baffles can have the configuration of FIG. 4. FIG. 4 shows four panels a) to d). Like FIG. 3, FIG. 4 also shows the joint functioning of a steam belt distributor and deflectors for homogenizing steam near a steam inlet. The structure and function of the steam belt distributor of FIG. 4 is similar to that of FIG. 3, with some particular differences which are elaborated on below.

FIG. 4 panel a) shows a cross-section through a stripper near the steam inlet, panel b) shows a perspective view on a steam belt distributor (170), panel c) is a detailed top view of a deflector (137) between tubes (150), and panel d) is a detailed side view of a deflector (137).

The steam belt distributor (170) of FIG. 4 operates as follows: steam enters the shell-side space (130) of the stripper through a heating fluid inlet (131). In entering the shell-side space (130), the steam first enters a belt-shaped space (171) formed between the stripper's shell (160) a steam belt distributor (170). The belt-shaped space (171) is an annular space between the steam belt distributor and the shell. The steam belt distributor (170) is a metal sheet shaped as an open cylinder that has a perforated area (178) and a non-perforated area (179).

During normal operation, steam enters through the heating fluid inlet (131) at the left hand side of the stripper, and it enters the belt-shaped space (171). In the left-hand side of the belt-shaped space (171), the steam belt distributor (170) comprises a plurality of perforations which allow steam to pass. The perforations are the smallest near the heating fluid inlet (131) and become gradually larger as the distance to the heating fluid inlet (131) increases, such that the steam flow is homogenized. At the right-hand side of the steam belt distributor (170), near the opening in the single segmental baffle (134), the steam belt distributor comprises a closed area (179) where it does not comprise any perforations, i.e. where it is closed.

Deflectors (137) are arranged adjacent to the edge (1341) of the single segmental baffle (134) which is the closest to the heating fluid inlet (131). These deflectors further homogenise the steam flow in the stripper segment near the heating fluid inlet (131). The deflectors are mirror symmetrically arranged around a vertical central plane passing through the steam inlet (131) and the closed area (179) in the steam belt distributor. These deflectors are curved and the angle between adjacent deflectors is 15°.

Example 4

Figure 5:
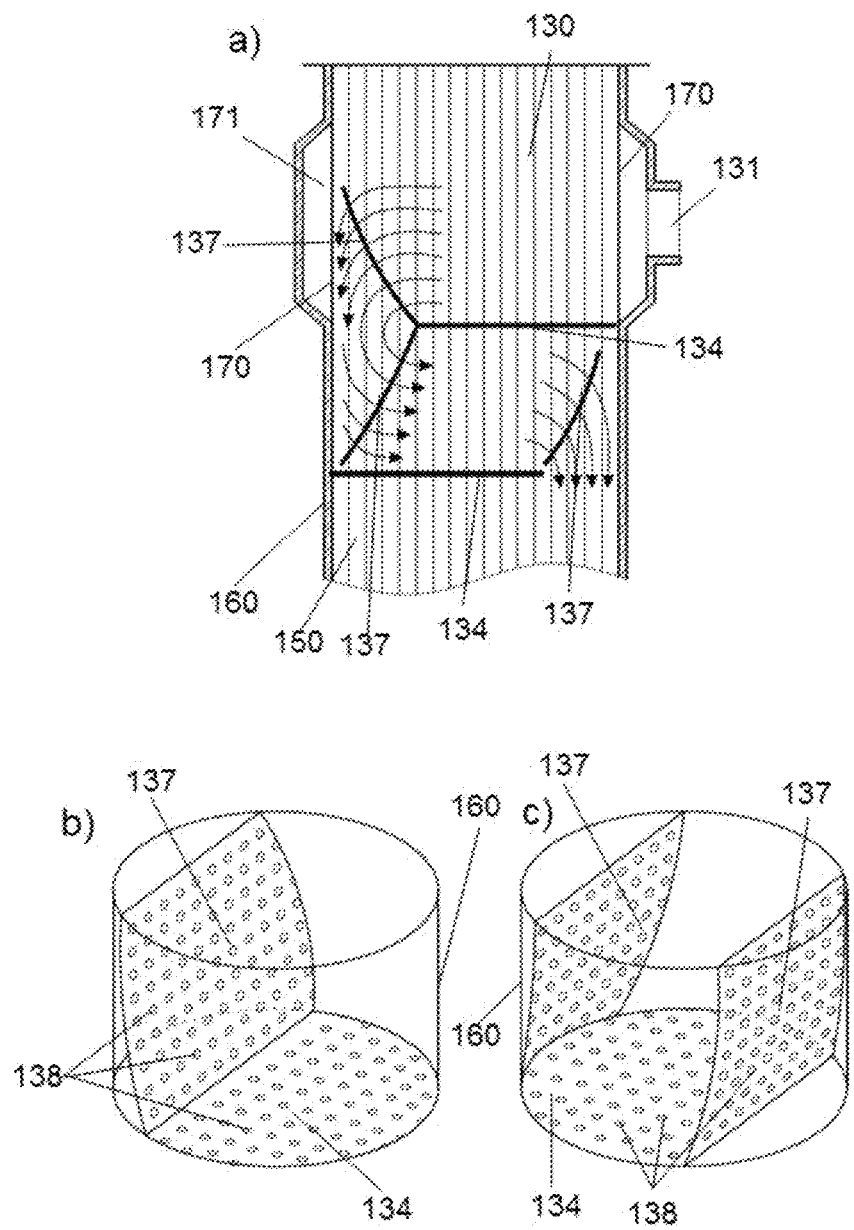
FIG. 5 shows an embodiment of the use of deflectors (137) with segmental baffles (134) in a shell-and-tube stripper for stripping a urea-carbamate mixture.

In a fourth example, reference is made to FIG. 5 which has three panels a) b), and c, all showing the use of deflectors (137) with single segmental baffles (134) in a shell-and-tube stripper for stripping a urea-carbamate mixture.

Whereas the deflector (137) or deflectors (137) positioned in the stripper segment near the steam belt distributor (170) (see example 3) are effective at homogenizing the flow of steam near the steam inlet (131), steam flow inhomogeneities and the associated inhomogeneous heating persists further down the stripper. Therefore, it is desirable to use further deflectors at other locations in the shell-side space (130). These deflectors (137) further increase the homogeneity by which tubes (150) in the stripper are heated by additionally homogenizing the flow of steam.

The stripper comprises a shell (160) which functions as its outer wall, tubes (150) in which a urea-carbamate mixture is stripped, a heating fluid inlet (131), and steam belt distributor (170). Steam enters the stripper through a heating fluid inlet (131), and enters a belt-shaped space (171) between the shell (160) and a steam belt distributor (170). The steam leaves the belt-shaped space (171) and is guided through the bulk of the stripper's shell-side space (130) by means of segmental baffles and deflectors (137).

Both the single segmental baffles (134) and the deflectors (137) are perforated. The perforations allow tubes (150) to pass through the deflectors (137) and the single segmental baffles (134). The perforations (138) have varying sizes depending on the orientation of the baffle or deflector at the points at which the tubes (150) pass through the baffles (134) and deflectors (137). The perforations (138) tightly fit around the corresponding tubes (150).

Optionally, the deflectors and/or single segmental baffles (134) comprise additional perforations (138) which allow for the passage of steam, which can be useful to avoid the formation of stagnant flow in some locations and under certain conditions.

The single segmental baffles (134) are arranged horizontally and the orientation of the deflectors (137) varies depending on where they are positioned in the shell-side space (130).

In particular, the deflectors (137) shown in FIG. 5 are oriented at an angle between 45.0° and 90.0° with the horizontal plane, and they are positioned at the edges of the single segmental baffles (134) they are associated with.

Panel a) shows a vertical cross section through the stripper near the steam inlet (131).

Panel b) shows a perspective view of a single segmental baffle (134) and a deflector (137).

The specific configuration shown in panel b) is specifically related to the topmost single segmental baffle (134) and the associated deflector. This topmost single segmental baffles is associated with only one deflector (137).

Panel c) shows a perspective view of a single segmental baffle (134) which is located further down the stripper. Panel c) also shows two deflectors (137) which are associated with the single segmental baffle. These deflectors (137) are positioned above and adjacent to the single segmental baffle.

Example 5

Figure 6:
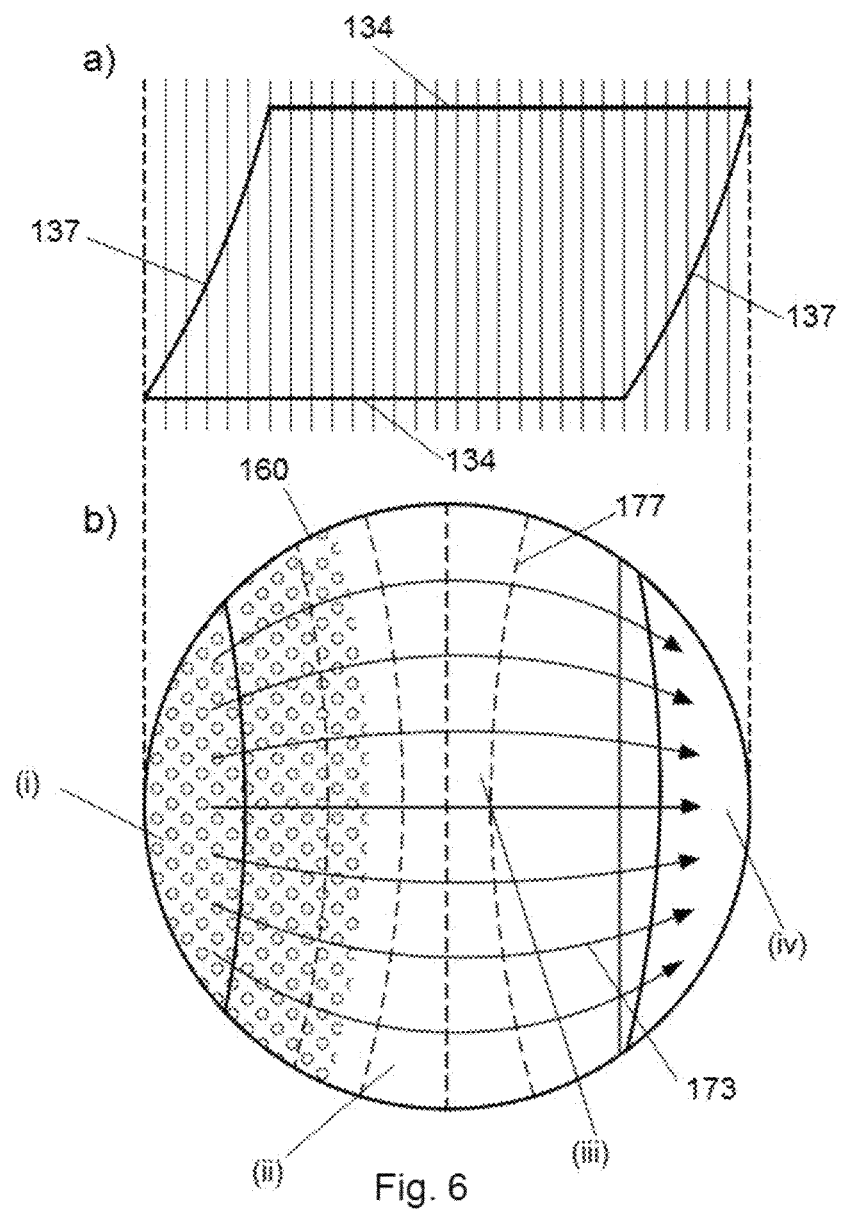
FIG. 6 shows an embodiment of a section of a stripper between two single segmental baffles.

In a further example, reference is made to FIG. 6 which shows a section of a stripper between two single segmental baffles. In particular, panel a) shows a cross section which is parallel to the baffles, and panel b) shows a cross section which is perpendicular to the baffles and perpendicular to the deflectors. The flow path of steam is indicated by means of streamlines (173). Steam enters the section in region (i) on the left-hand side and leaves the section in region (iv) on the right-hand side. Left unobstructed, most steam would follow central path (ii) on its way from (i) to (ii), and little steam would take the longer path (ii).

Such inhomogeneous flow would lead to inhomogeneous heating of the tubes in the stripper. In order to increase the homogeneity of steam flow, deflectors (137) are installed near the region (i) where steam enters the section, and near the region (ii) where steam leaves the section. The deflectors (137) are perforated and create an additional pressure drop along the central path (iii), thus forcing more steam to take longer route (ii). This also results in an even pressure drop through the section as indicated by evenly spaced isobars (177) in panel b).

Example 6

Figure 7:
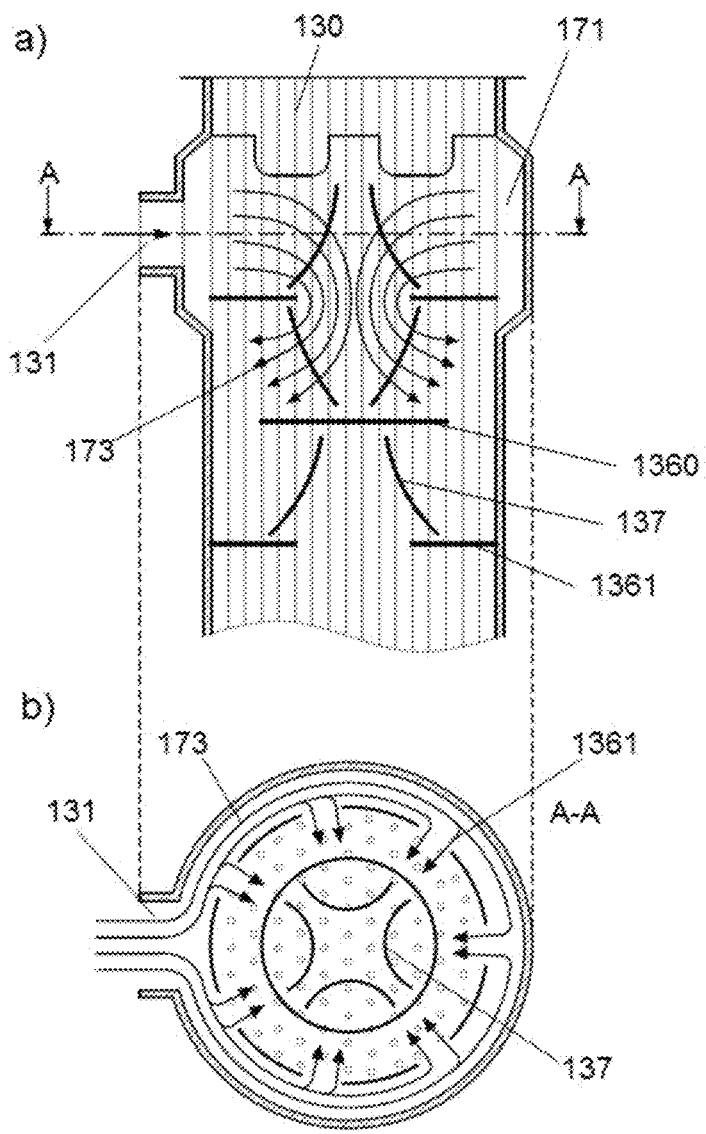
FIGS. 7 and 8 which show an embodiment of a stripper comprising disk-and-doughnut baffles (1360, 1361).
Figure 8:
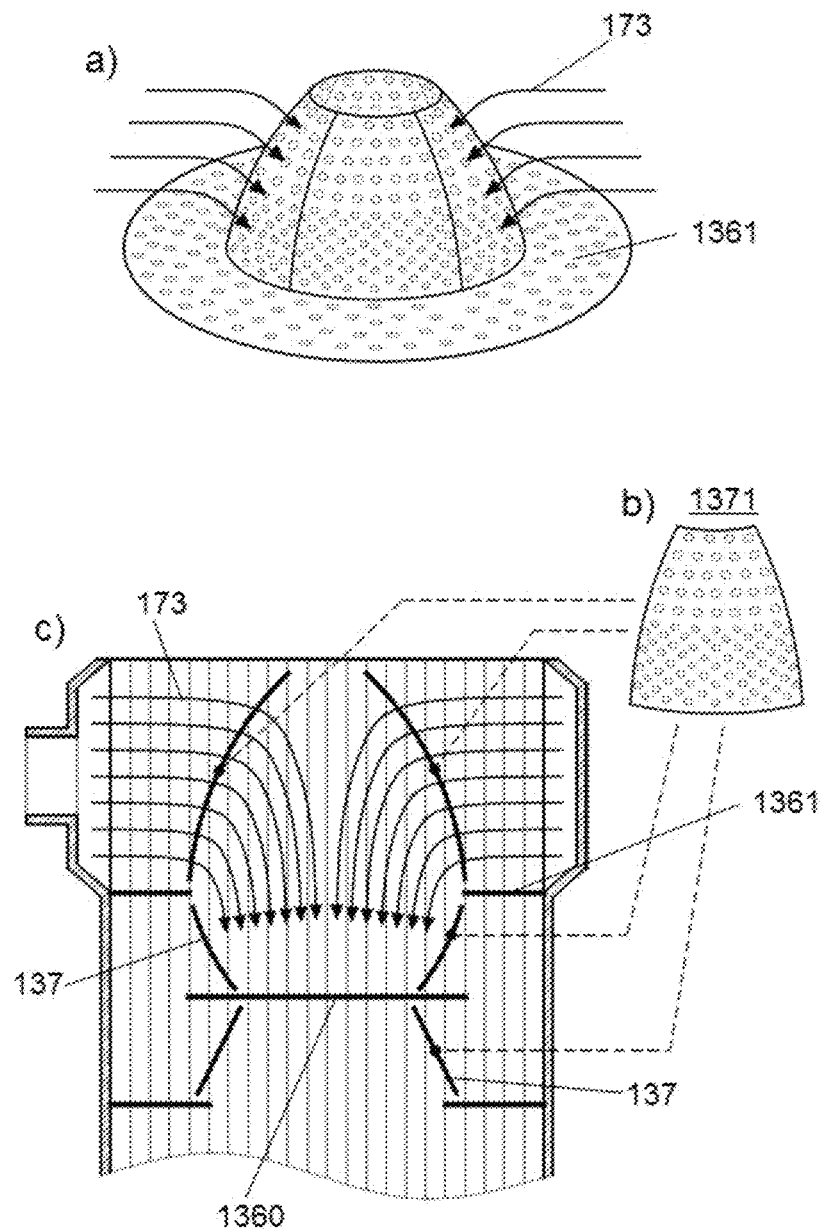

In a further example, reference is made to FIGS. 7 and 8 which show a stripper comprising disk-and-doughnut baffles (1360, 1361). The disk baffles (1360) are shaped as a perforated disk. The doughnut baffles (1361) are perforated, ring-shaped, and comprise a central hole.

Alternatively, the disk baffles (1360) are plates shaped as a convex polygon that comprises 5 or more sides, and they comprise a hole shaped as a convex polygon. The hole in the doughnut baffles (1361) is about the same size as the diameter of the disk baffles (1360).

In particular, FIG. 7 panel a) shows a cross section through a stripper. FIG. 7, panel b) shows another cross section through the stripper which is perpendicular to the cross section of FIG. 7 panel a). FIG. 8 panel a) shows a perspective view of a disk baffle (1361) and a deflector (137). FIG. 8 panel b) shows a single part (1371) of a deflector (137). FIG. 8 panel c) shows a cross section through a stripper.

Steam enters through a steam inlet (131) and flows through a belt-shaped space (171) in a steam belt distributor before entering the bulk of the stripper's shell-side space. Disk baffles (1360) and doughnut baffles (1361) are alternatingly positioned along the length of the stripper, and improve the homogeneity of steam flow. Unfortunately, this improvement is imperfect. In order to enhance the homogeneity of steam flow, deflectors (137) are positioned between subsequent disk baffles (1360) and doughnut baffles (1361). The flow of steam through the stripper's shell-side space is (130) is indicated by means of stream lines (173).

The deflectors (137) are made up of a plurality of distinct parts (1371). Both the deflectors (137), the ring baffles (1361), and the disk baffles (1360) are perforated. The perforations (138) in the disk baffles (1360) and the ring baffles (1361) have a uniform size. The size of the perforations (138) in the deflectors (137) varies and is adapted to optimize steam flow homogeneity.

The deflectors extend themselves from the disk baffles to the adjacent doughnut baffles level. The deflector should stretch themselves relatively close to the centre of the stripper at disk levels to ensure that the most central tubes are not left in stagnant conditions. The deflector can be curved or flat. Ideal hole pattern is given by smaller holes closer to the doughnut level and bigger closer to disk level.

Example 7

Figure 9:
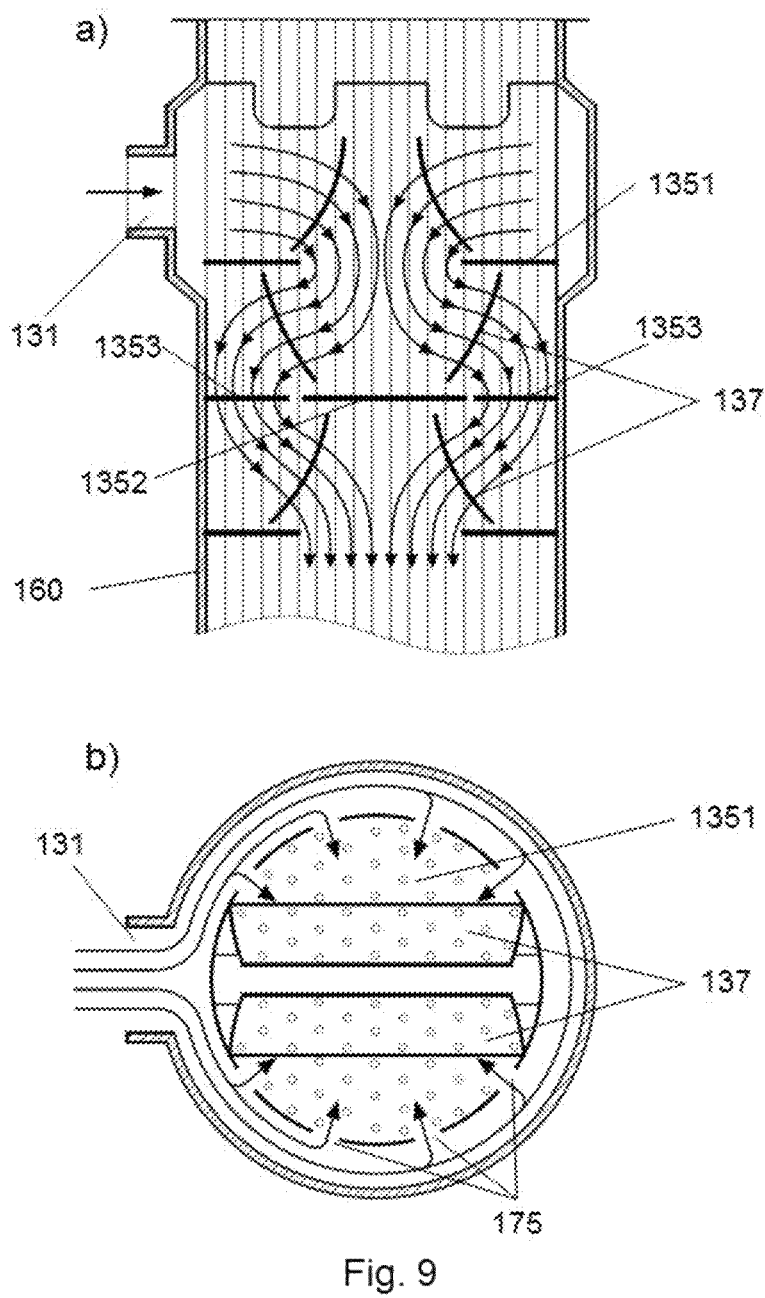
FIGS. 9 and 10 show an embodiment of a stripper comprising double segmental baffles (1351, 1352).
Figure 10:
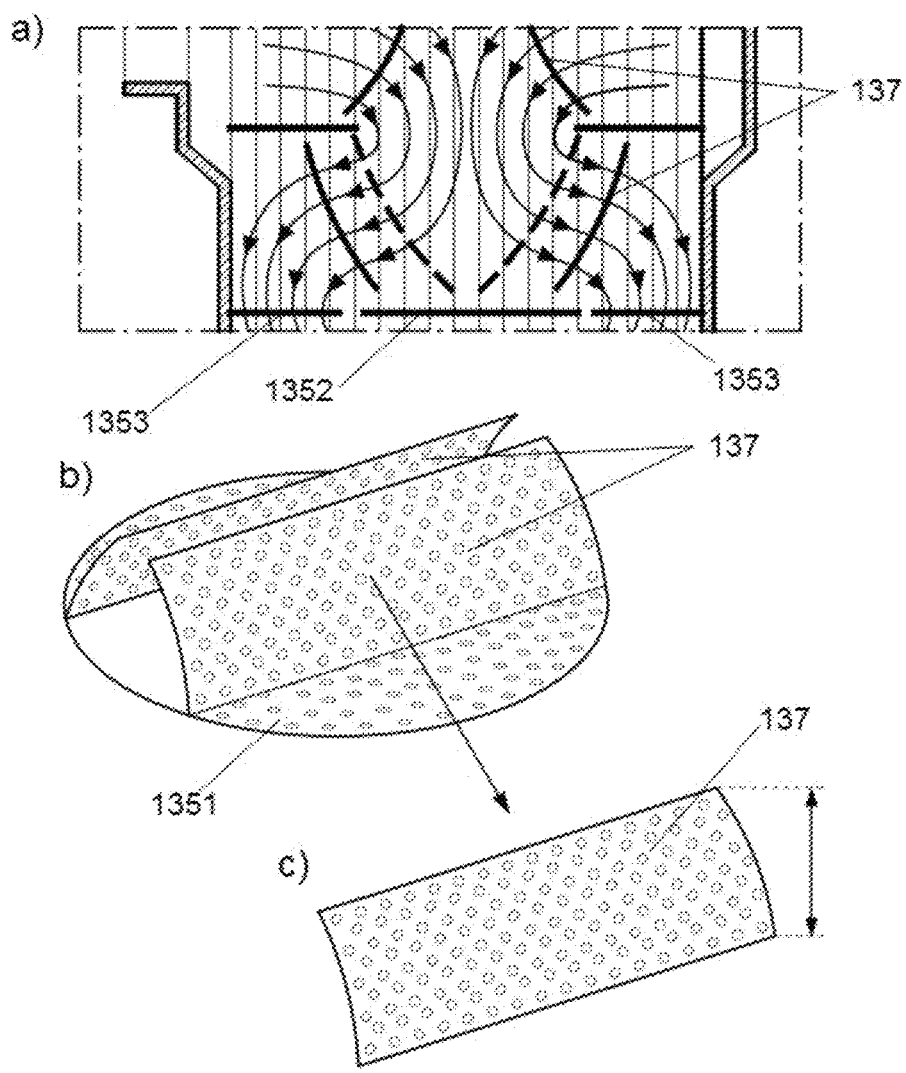

In a further example, reference is made to FIGS. 9 and 10 which show a stripper comprising double segmental baffles (1351, 1352). The double segmental baffles (1351, 1352) comprise inner baffles (1352) and outer baffles (1351). The inner baffles (1352) are shaped as a single sheet of perforated sheet material which is bounded by two parallel lines and the stripper's shell. The outer baffles (1351) are shaped as two perforated circular segments. They are positioned two-by-two at opposing sides of the stripper. The chords of the outer baffles are parallel to each other and they are parallel to the parallel lines which bound the inner baffles. Between the inner baffles (1352) and the shell (160) of the stripper, segmented equalization baffles (1353) are provided. The segmented equalization baffles (1353) are perforated to allow for the passage of steam, in particular by comprising perforations with a varying diameter. In particular, these perforations have a larger diameter the closer to the shell (160).

In particular, FIG. 9 panel a) shows a cross section through a stripper. FIG. 9 panel b) shows another cross section through the same stripper. The cross section of panel b) is perpendicular to the cross section shown in panel a). FIG. 10 has two panels. FIG. 10 panel a) shows a close-up view of a segment between consecutive inner and outer baffles. FIG. 10 panel b) shows a perspective view of two outer baffles (1351) and their associated deflectors (137).

The deflectors (137) extend from the edges of the inner baffle (1352) to the edges of the outer baffles (1351). The deflectors (137) should be positioned relatively close to the centre of the stripper at the inner baffle levels to ensure that the tubes near the centre of the stripper are not left in stagnant conditions.

The deflectors (137) can be curved or flat. Ideally, their perforations have a varying size and preferably, the perforations in the deflectors (137) are smaller close to the outer baffle level and bigger closer to inner baffle level.

Note that, referring to FIG. 10, the curvature of the deflectors (137) is opposite in panel a) on the one hand, and in panels b) and c) on the other hand. The skilled person will select an appropriate curvature depending on the stripper's operating conditions.

Apart from the shape of the baffles, the structure of the stripper according to the present example is substantially identical to that of example 6.

Example 8

In a further example, an exemplary method for operating the stripper (100) of example 1 is discussed. In this method, the stripper (100) is positioned vertically, and the top end (110) is positioned at the top of the stripper, and the bottom end (120) is positioned at the bottom of the stripper (100). Any type of baffles (segmented, double segmented, or disc-and-doughnut) can be used together with deflectors in this stripper.

The method involves providing a mixture comprising urea and ammonium carbamate to the inlet (111) for the urea/carbamate mixture, and providing $CO_2$, the stripping gas, to the inlet (121) for the stripping gas.

The stripping gas and the urea/carbamate mixture flow in counter-current through the tubes (150). Concurrently, the urea/carbamate mixture is heated and the ammonium carbamate comprised in the urea/carbamate mixture decomposes to form gaseous $NH_3$ and $CO_2$ which are entrained by the stripping gas. Thus, a urea/carbamate stream concentrated in urea is formed in the tubes (150). This stream flows downward to the bottom end (120) where it is extracted by means of the outlet (122) for a urea/carbamate stream concentrated in urea.

Steam is used as a heating fluid, and is provided to the shell-side space (130) by means of a heating fluid inlet (131). Segmented, double segmented, or disk-and-doughnut baffles are used along with deflectors in order to homogenize the flow of steam in the shell-side space.

The steam has an operating pressure of about 18 bar (absolute pressure), it has a mass flow rate of 36 kg/sec, and a vapour density of 9 kg/m$^3$.

Condensed steam is extracted from the shell-side space (130) through the heating fluid outlet (133). In traveling from the heating fluid inlet (131) to the heating fluid outlet (133), the steam travels through the shell-side space (130) and heats the tubes (150) and their content, which allows the aforementioned decomposition of ammonium carbamate to form $NH_3$ and $CO_2$. The provision of the deflectors in addition to the segmented, double segmented, or ring-and-doughnut baffles ensures homogeneous heating of the tubes (150) and their contents which in turn results in improved stripper efficiency and less corrosion in the tubes.

Example 9

In a further example, an exemplary method for operating the stripper (100) of examples 2 and 8 is discussed. In particular, its operation is similar to that of the stripper of examples 1, except that no stripping gas is provided to the bottom end. Instead, $NH_3$ and $CO_2$ formed during the decomposition of ammonium carbamate serve as the stripping gas.

Example 10

Figure 11:
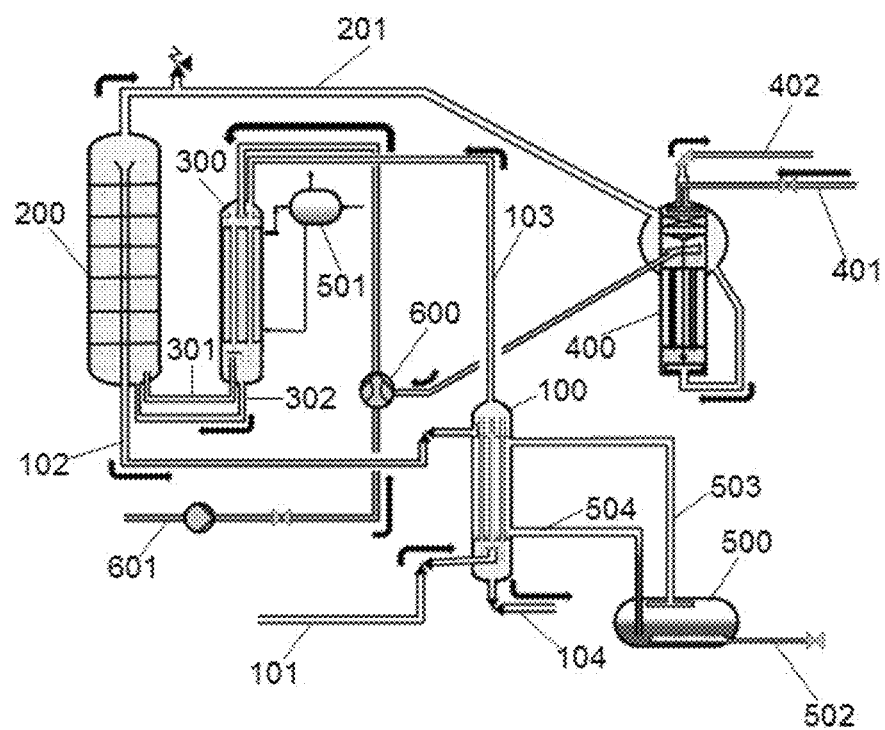
FIG. 11 shows an example of a high-pressure section of a specific type of urea plant in which the presently disclosed technology can be used.

In a further example, reference is made to FIG. 11 which shows selected parts of a urea plant (1000). The urea plant comprises a stripper (100) as described in example 1, a reactor (200) for converting ammonium carbamate into urea, a carbamate condenser (300) for forming ammonium carbamate, and a scrubber (400) for condensing $NH_3$ and $CO_2$ vapours coming from the reactor and the carbamate condenser. The scrubbing liquid is a carbamate solution fed by a tube (401) from a downstream section.

A stripping gas feed (101) is in fluid connection with the inlet (121) for stripping gas of the stripper (100). A tube (104) for a urea/carbamate stream concentrated in urea is in fluid connection with the outlet (122) of the urea/carbamate stream concentrated in urea of the stripper (100).

The stripper (100) comprises a shell-side space see FIG. 1 (130) which comprises a heating fluid inlet and a heating fluid outlet see FIG. 1 (131, 133).

The heating fluid inlet is in fluid connection with a tube for a heating fluid stream (503). The heating fluid outlet is in fluid connection with a tube for a cooled heating fluid stream (504).

The tube for a heating fluid stream (503) and the tube for a cooled heating fluid stream (504) are in fluid connection with a heating fluid supply (500), which in turn is in fluid connection with a connection (502) to an external heating fluid supply.

The stripper (100) is further in fluid connection with a tube (102) for a urea/carbamate stream. This tube (102) delivers the urea/carbamate stream from a reactor (200) which transforms ammonium carbamate into urea. The reactor in turn is provided with ammonium carbamate by a carbamate condenser (300) via a tube (302) and with gaseous $NH_3$, $CO_2$, water, and inerts via another tube (301). Heat generated by carbamate formation in the carbamate condenser (300) is extracted by means of steam and a vapour supply (501).

Example 11

In a further example, reference is made to FIGS. 12, 13, 14, and 15 which illustrate some of the challenges which are overcome by way of the systems and methods according to the present invention. In particular, the present systems and methods offer improved stripper life and enhanced stripper efficiency. The present example illustrates these issues for a specific $CO_2$ stripper. However, similar corrosion issues are expected to occur in other types of strippers as well when inhomogeneous heating occurs though the precise corrosion pattern is expected to depend on the specific stripper morphology. One example of a different type of stripper in which similar corrosion issues are expected is a self-stripper.

Figure 12:
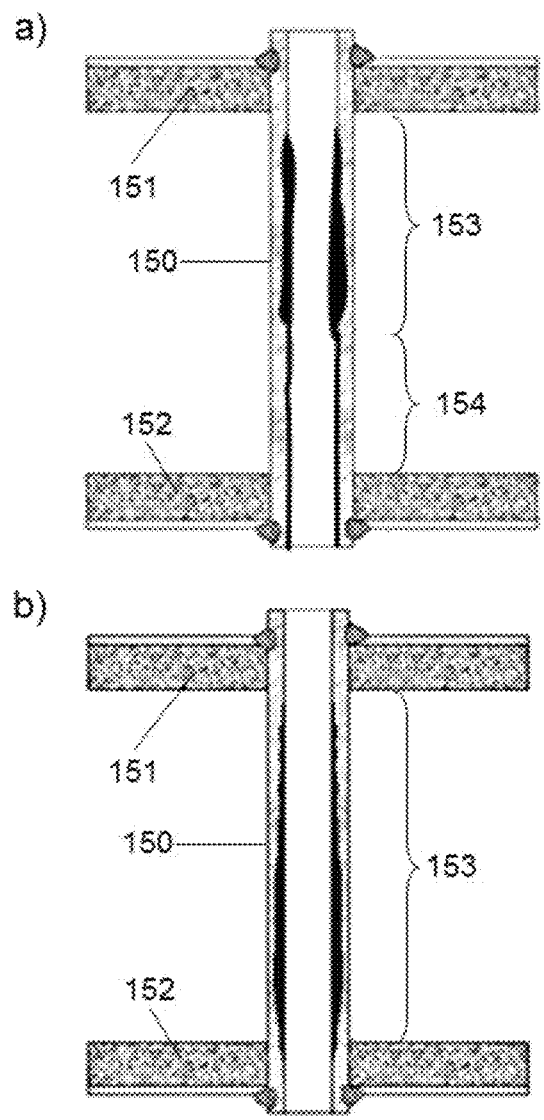
FIG. 12 shows two corrosion patterns which concurrently occur in the tubes of prior art shell-and-tube strippers for stripping urea/carbamate mixtures. In some modes of operation, the corrosion pattern shown in FIG. 4a occurs in $CO_2$ strippers and that shown in FIG. 4b occurs in self-stripping strippers.

FIG. 12 shows two corrosion patterns that particularly occur in sizable $CO_2$ strippers with only one heating fluid inlet, with stainless steel tubes, and in which $CO_2$ is used as a stripping gas for stripping a urea/carbamate solution. More specifically, the corrosion pattern was observed in shell-and-tube strippers which have tubes of 6 m high, have a shell diameter of about 3 m, have disk-and-doughnut baffles installed in the shell-side space, and comprise about 5000 tubes (150).

The corrosion type also depends on whether the stripper is a $CO_2$ stripper or a self-stripping stripper.

Indeed, the corrosion pattern shown in FIG. 12 a) was found to commonly occur in small-diameter $CO_2$ strippers and that shown in FIG. 12 b) was found to commonly occur in small-diameter self-stripping strippers. In the context of the present invention, both $CO_2$ strippers and self-stripping strippers are specific configurations of shell-and-tube strippers.

Shell-and-tube strippers comprise a top tube sheet (151) which is positioned above and at the top end of the tubes. It separates a shell-side space comprising disk-and-doughnut baffles from the stripper's top end. The top tube sheet (151) also allows a urea/carbamate mixture to flow down as a liquid film along the internal wall of the tubes (150). It also allows a gas mixture comprising $CO_2$ and $NH_3$ to exit the tubes (150).

The shell-and-tube strippers also comprise a bottom tube sheet (152) which is positioned below and at the bottom end of the tubes. It separates the shell-side space from the stripper's bottom end. The bottom tube sheet (152) also allows a urea/carbamate stream concentrated in urea to exit the tubes (150) and in $CO_2$ stripper it allows the $CO_2$ stripping gas to enter the tubes (150).

Figure 13:
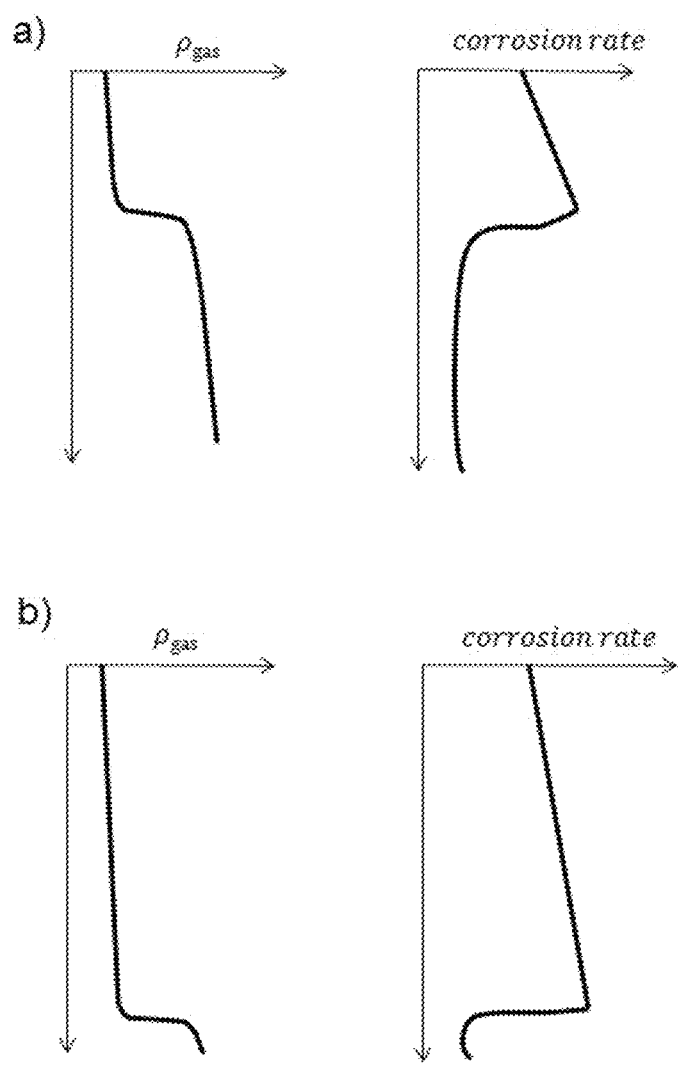
FIG. 13 shows gas densities and corrosion rates which concurrently occur in the tubes of prior art shell-and-tube strippers for stripping urea/carbamate mixtures.

These strippers feature different corrosion patterns in the outer and inner tubes of the stripper. The inner tubes approximately cover the cross-section of the disk baffles, and the outer tubes approximately cover the cross-section of the doughnut baffles. The corrosion pattern in the outer tubes is shown in FIG. 12, panel a). The corrosion pattern in the inner tubes is shown in FIG. 12, panel b). The corrosion rate in the outer tubes is schematically shown in FIG. 13, panel a), right-hand graph. The corrosion rate in the inner tubes is schematically shown in FIG. 13, panel b), right-hand graph.

In the outer tubes, both a corrosion area (153) and a scaling area (154) are present.

Conversely, in the inner tubes, only a corrosion area (153) is present. In the corrosion areas, corrosion of the tubes occurs. In the scaling area (154), no corrosion occurs but iron scale is deposited. Although the corrosion area in the outer tubes extends only along part of the length of the tubes, the corrosion is much more severe in the corrosion area (153) of the outer tubes. The useful life of strippers is limited by the rate of corrosion of the tubes.

Therefore, if the rate of corrosion occurring in the outer tubes (150) could be reduced, the extent of corrosion after a certain period in operation would be reduced, and consequently the useful life of the strippers could be increased.

Without restricting the present invention to any particular mode of operation, it is believed that the occurrence of the inhomogeneous corrosion in prior art $CO_2$ strippers for stripping ammonium carbamate from urea/carbamate streams can be explained as follows. During normal operation of prior art strippers, a urea/carbamate mixture flows down the internal wall of the tubes (150) as a falling film pattern, and it is heated by means of steam provided to the shell-side space. Under influence of the heat, the ammonium carbamate in the urea/carbamate mixture decomposes to form gaseous $NH_3$ and $CO_2$, which flow upward along with the stripping gas. Thus ammonium carbamate is gradually decomposed.

In arriving at the present invention, it was realised that the presence of iron scales in the lower part of the outer tubes, i.e. the scaling part (154), indicates that in the scaling part, the liquid phase consists mainly of urea, residual carbamate, free $NH_3$ and water. In other words, a large portion of the ammonium carbamate has decomposed, thereby leaving a liquid phase essentially consisting of urea, residual carbamate, free $NH_3$ and water that flows down the tube walls at the scaling part (154): Iron (Fe) is significantly less soluble in urea than in ammonium carbamate. Conversely, the centre tubes do not have a scaling part, which indicates that ammonium carbamate has not entirely been decomposed.

It was further realised that the rate at which the ammonium carbamate is decomposed increases with an increasing amount of heat which is provided to the tubes (150).

Accordingly, the observation that ammonium carbamate decomposes closer to the top end of the stripper in the outer tubes indicates more intense heating in the outer tubes compared to the inner tubes. Because the heat is provided by means of steam flowing on the shell-side space of the stripper, the amount of heat is determined by the flow of steam. Therefore, the provision of more heat to the outer tubes compared to the inner tubes is related to the flow of steam in the shell-side space of the stripper. The inventors thus discovered that inhomogeneous flow of steam in the shell-side space of the stripper is the cause for the observed increased corrosion rate in the outer tubes compared to the inner tubes.

It was additionally discovered that the inhomogeneous heating of the tubes results in inefficient operation of strippers related to inhomogeneous $CO_2$ stripping gas distribution over the tubes. In particular, it was found that under typical operating conditions of prior art shell-and-tube strippers featuring a steam inlet and disk-and-doughnut baffles in the shell-side space, the gas flow rate through the less-heated inner tubes is significantly higher than the gas flow rate through the more heated outer tubes. Inhomogeneous stripping gas flow leads to process inefficiencies such as the inhomogeneous stripping of the carbamate in the tubes and consequently an ineffective decomposition of ammonium carbamate in the stripper.

Figure 15:
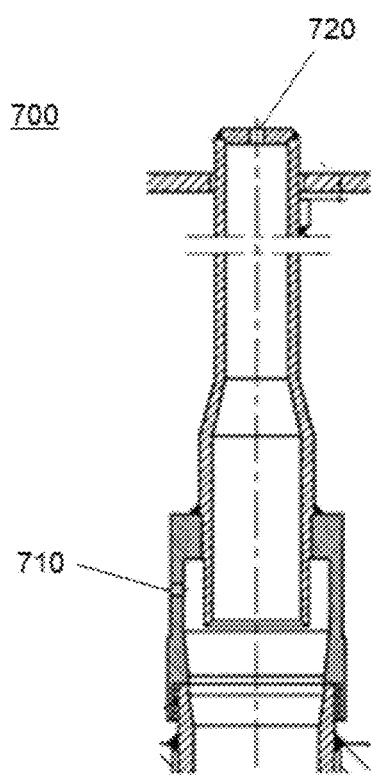
FIG. 15 shows an example of a ferrule (700).

Liquid dividers (so called ferrules, an example of which is shown in FIG. 15), are installed in the stripper front head and coupled with tubes in the top tube sheet in order to assure an even distribution of the urea/carbamate mixture though each tube via holes (710) in the bottom part of the ferrule. Also, one or more holes (720) in the liquid divider top part are installed to release the gas flow to the stripper top end. The stripping gas flow is determined by a combination of hydrodynamic and hydrostatic effects. The hydrodynamic effects correspond to the pressure drop across the one or more holes (720) in the top liquid dividers (so called ferrules), and can be written as $\Delta p = 0.5\, \rho v^2$, with $\Delta p$ pressure drop, $\rho$ fluid density, and $v$ fluid velocity.

For typical operating conditions, the hydrodynamic pressure drop across the tubes is about 250 Pa. The hydrostatic effect corresponds to the pressure effect due to the gas density along the height of the tubes, and, for a given pressure, can be written as $\Delta p = \Delta \rho g h$. The hydrostatic pressure drop in the stripper that was described above is estimated to be about 5500 Pa. Accordingly, the hydrostatic effect dominates, and it is therefore mostly responsible for the stripping gas flow distribution across the tubes. Therefore, any possible imbalance in stripping gas flow between the tubes caused by differences in hydrostatic pressure drop across the tubes cannot be compensated by changing the hydrodynamic pressure drop across the hole on top of the ferrules. The pressure drop across the hole might be changed by changing the size of the hole in the ferrule. By reducing the hole size the pressure drop would increase and vice versa.

It was discovered that in more heated tubes, carbamate decomposition and the accompanying release of $CO_2$ and $NH_3$ occurs in the top parts of the tubes, i.e. near the top end, e.g. in the upper 50% of the tubes. Therefore, the partial pressure of $NH_3$ at the top of the tubes is high, whereas the partial pressure of $NH_3$ in the bottom part of the tubes is low. The stripping gas is $CO_2$, and under the same conditions, $NH_3$ has a lower density than $CO_2$. Because the gas flows upward, the $NH_3$ concentration is highest in the top part of the tubes. Therefore, the top part of the tubes has a lower specific density than the bottom part of the tubes. This is illustrated in FIG. 13, panel (a). This figure shows that the tubes comprise three regions: a lower region featuring a higher gas density and lower corrosion rate, a transition region in which the gas density and the corrosion rate suddenly change, and an upper region which has a higher corrosion rate and a lower gas density. In particular, going up the tubes, the first region the gas encounters is the lower region. In the lower region, the gas density gradually decreases as the gas is heated while it travels up the tubes. In the transition region the gas density suddenly decreases due to the decomposition of ammonium carbamate and the resulting release of ammonia gas. In the upper region, the gas density gradually decreases as the gas is further heated, and the corrosion rate is high because the tube walls are in contact with an intensely heated urea/carbamate solution. Indeed, the corroded thickness of the tube increases moving downwards within the upper region, as the solution gets warmer while moving downwards.

Also, the inventors discovered that in less heated tubes, carbamate decomposition occurs from the top of the tube until close to the bottom of the tubes, such that the entirety of the less heated tubes has a lower specific density compared to the more heated tubes, which in turn causes the hydrostatic pressure in the less heated tubes to be lower than the hydrostatic pressure in the more heated tubes.

Figure 14:
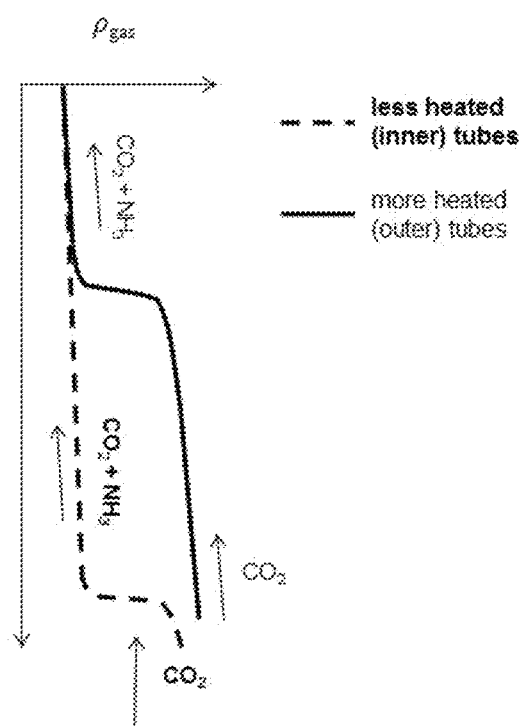
FIG. 14 is a schematic representation of gas density as a function of position in less-heated tubes and more heated tubes.

The gas density profile of the more heated outer tubes is shown in FIG. 13, panel a), left-hand graph. The gas density profile of the less-heated inner tubes is shown in FIG. 13, panel (b), left-hand graph. The gas density profile in the less heated tubes and the more heated tubes is also compared in FIG. 14. FIG. 14 clearly shows that in the less heated tubes, carbamate decomposes near the bottom of the stripper compared to the more heated tubes. This results in a different density profile, which in turn causes a hydrostatic pressure difference. The lower hydrostatic pressure in the inner tubes causes the flow rate of the stripping gas in the less heated tubes to be higher than in the more heated tubes, which results in lower stripping efficiency.

This is slightly counteracted when $CO_2$ stripping gas with a lower temperature than the tubes is used, because the cooler $CO_2$ gas lowers the density of the gas phase in the tube, thereby increasing the hydrostatic pressure and counteracting the effect of the increased heating.

However, this effect is not sufficiently pronounced to eliminate the stripping inefficiencies associated with inhomogeneous heating.

Indeed, simulations (results not included) showed that even a small difference in the density profile results in a significant effect on the flow distribution. In particular, the area-weighted average fluid flow velocity in the less-heated inner tubes was estimated to be ca. 5 times higher than the area-weighted averaged fluid flow velocity in the more heated outer tubes. This large discrepancy in fluid flow velocity results in significant stripping inefficiencies in prior art strippers.

In conclusion, inhomogeneous heating in sizable prior art $CO_2$ strippers results in corrosion issues and inefficient stripping. This problem can be solved by providing deflectors in addition to segmented, double segmented, or disk-and-doughnut baffles; thus allowing homogeneous heating such that all tubes of the stripper can be heated moderately and uniformly, which results in a low rate of corrosion throughout the stripper. In addition, the homogeneous heating results in a homogeneous gas density profile, which in turn results in a uniform stripping gas flow rate and improved stripping efficiency.

Example 12

Figure 16:
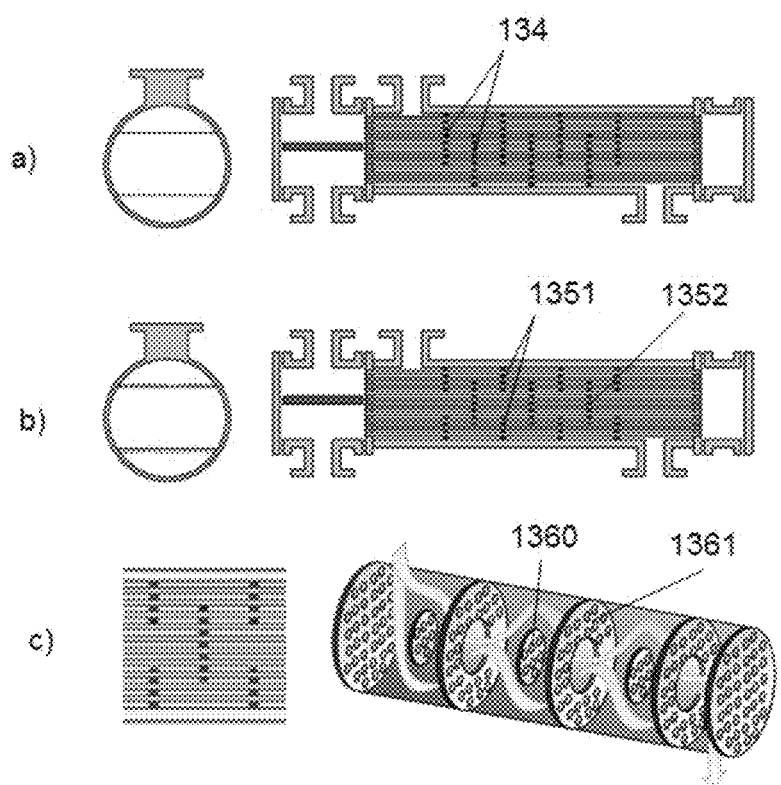
FIG. 16 shows several exemplary baffle types.

In a further example, reference is made to FIG. 16, which shows several types of baffles (134, 1351, 1352, 1360, 1361) which can be used in the shell-side space of the present strippers together with the deflectors described herein.

In particular, panel a) shows segmental-type baffles (134). These baffles are arranged to obstruct alternating parts, e.g. diametrically opposed parts, of the shell-side space, thus forcing heating fluid to follow a sinuous path. In strippers with a circular cross section, each baffle obstructs the shell-side space bounded by a chord of the circular cross section and the major circle arc whose endpoints are the same as those of the chord.

Panel b) shows double-segmental type baffles (1351, 1352) which feature two types of obstructions that are positioned alternatingly. For strippers with a circular cross section, the first type of obstruction features two plates that each block a diametrically opposed circle segment of the shell-side space, thus forcing heating fluid to flow through the centre of the shell-side space at their position. The second type of obstruction is a centrally disposed obstruction between two parallel chords, thus forcing heating fluid to flow near the sides of the shell-side space. Preferably, the second type of obstruction is positioned between the two plates of the first type of obstruction, when viewed from the top of the stripper.

Panel c) shows disk-and-doughnut type baffles (1360, 1361) which feature two types of obstructions that are positioned alternatingly. These types of baffles are commonly used in strippers with a circular cross section. The first type of obstruction is a disk which is centrally disposed within the shell-side space, thus forcing heating fluid to flow near the sides of the shell-side space. The second type of obstruction is a doughnut-shaped plate. It obstructs fluid flow near the edges of the shell-side-space, and it has a hole that allows heating fluid to pass near the centre of the shell-side space.

The presence of lateral and deflectors as described herein further improves the stripping efficiency and reduces tube corrosion by increasing the homogeneity by which the tubes are heated.

The invention claimed is:

1. A shell-and-tube stripper for stripping a urea/carbamate mixture,
the stripper comprising a top end in fluid connection with a bottom end through a plurality of tubes disposed within a shell;
the top end comprising an inlet for a urea/carbamate mixture and an outlet for a gas mixture comprising a stripping gas and one or more stripped compounds;
the bottom end comprising an outlet for a urea/carbamate stream concentrated in urea;
the shell-and-tube stripper further comprising a heating fluid inlet and a heating fluid outlet in fluid connection with a shell-side space disposed between the plurality of tubes and the shell, and a steam belt distributor and an inlet deflector for homogenizing a flow of steam near the heating fluid inlet;
the shell-and-tube stripper having a longitudinal direction and lateral cross sections, the longitudinal direction being parallel to the tubes and the lateral cross sections being perpendicular to the longitudinal direction;
wherein a plurality of baffles are arranged in the shell-side space, the baffles defining a multi-pass crossflow in the shell-side space, wherein the baffles are parallel with the lateral cross sections within a margin of error of less than 1°; and
wherein the stripper further comprises a plurality of deflectors positioned in a flow path, wherein the deflectors are at oblique or right angles with respect to the baffles.

2. The shell-and-tube stripper according to claim 1, wherein at least 80% of the deflectors are associated with a baffle of the plurality of baffles.

3. The shell-and-tube stripper according to claim 2, wherein the deflectors which are associated with a baffle of the plurality of baffles are physically attached to the baffle they are associated with.

4. The shell-and-tube stripper according to claim 1, wherein the stripper comprises more than 3000 tubes.

5. The shell-and-tube stripper according to claim 1, wherein the deflectors are at an angle between 10.0° and 90.0° with the baffles; and/or
wherein the deflectors describe an arc between 10.0° and 80.0° along a cross section through the shell-and-tube stripper which is parallel to the longitudinal direction and/or wherein the deflectors describe an arc between 10.0° and 80.0° along a lateral cross section through the shell-and-tube stripper.

6. The shell-and-tube stripper according to claim 5, wherein the angle which the deflectors are at with the baffles is between 45.0° and 90.0°.

7. The shell-and-tube stripper according to claim 1, wherein the deflectors are arched.

8. The shell-and-tube stripper according to claim 1, wherein the deflectors and/or the baffles are perforated.

9. The shell-and-tube stripper according to claim 8, wherein the perforations are circular.

10. The shell-and-tube stripper according to claim 1, wherein the baffles are single segmental baffles, each single segmental baffle being shaped as a circular segment having a chord, wherein the single segmental baffles are perpendicular to the longitudinal direction within a margin of error of less than 1.0%, wherein the single segmental baffles are consecutively positioned along the longitudinal direction of the shell-and-tube stripper, wherein an orientation of the single segmental baffles varies along the longitudinal direction of the shell-and-tube stripper, and wherein deflectors are positioned between consecutive single segmental baffles.

11. The shell-and-tube stripper according to claim 1, wherein the baffles are disk-and-doughnut baffles comprising disk baffles and doughnut baffles, each disk baffle being shaped as a disk, and each doughnut baffle being shaped as a ring comprising a hole, a diameter of the disk baffles being equal to or bigger than the diameter of the hole in the doughnut baffles within a margin of error of less than 10.0%, the disk baffles and the doughnut baffles being positioned perpendicular to the longitudinal direction within a margin of error of less than 1.0%, the disk baffles and the doughnut baffles being consecutively and alternatingly positioned along the longitudinal direction of the shell-and-tube stripper, wherein the deflectors are positioned between adjacent disk baffles and doughnut baffles.

12. The shell-and-tube stripper according to claim 1, wherein the baffles are double segmental baffles comprising outer baffles and inner baffles, each outer baffle being shaped as a circular segment having a chord, two outer baffles being arranged on opposing sides of a lateral cross section through the shell-and-tube stripper, the inner baffles being shaped as a mirror symmetrical area between the two outer baffles, two outer baffles and an inner baffle being positioned perpendicular to the longitudinal direction within a margin of error of less than 1.0%, wherein two outer baffles and an inner baffle are alternatingly positioned along the longitudinal direction of the shell-and-tube stripper, and wherein the deflectors are positioned between adjacent inner baffles and outer baffles.

13. The shell-and-tube stripper according to claim 1, wherein a second heating fluid inlet is in fluid connection with the shell-side space and is installed between the aforementioned heating fluid inlet and the heating fluid outlet.

14. The shell-and-tube stripper according to claim 1, wherein at least 90% of the deflectors are each associated with a baffle of the plurality of baffles.

15. The shell-and-tube stripper according to claim 1, wherein the stripper comprises more than 7000 tubes.

16. The shell-and-tube stripper according to claim 1, wherein the stripper comprises 3000 to 7000 tubes.

17. The shell-and-tube stripper according to claim 1, wherein the stripper comprises 5000 to 10000 tubes.

18. A system for production of urea comprising:
a carbamate condenser;
a urea reactor; and
a shell-and-tube stripper for stripping a urea/carbamate mixture, the stripper comprising a top end in fluid connection with a bottom end through a plurality of tubes disposed within a shell; the tope end comprising an inlet for a urea/carbamate mixture and an outlet for a gas mixture comprising a stripping gas and one or more stripped compounds; the bottom end comprising an outlet for a urea/carbamate stream concentrated in urea; the shell-and-tube stripper further comprising a heating fluid inlet and a heating fluid outlet in fluid connection with a shell-side space disposed between the plurality of tubes and the shell, and a steam belt inlet; the shell-and-tube stripper having a longitudinal direction and lateral cross sections, the longitudinal direction being parallel to the tube and the lateral cross sections being perpendicular to the longitudinal direction; wherein a plurality of baffles are arranged in the shell-side space, the baffles defining a multi-pass crossflow in the shell-side space, wherein the baffles are parallel with the lateral cross sections within a margin of error of less than 1°; and wherein the stripper further comprises a plurality of deflectors positioned in a flow path, wherein the deflectors are at oblique or right angles with respect to the baffles.

19. A method for stripping a urea/carbamate mixture, the method comprising steps of:
providing a shell-and-tube stripper for stripping a urea/carbamate mixture, the stripper comprising a top end in fluid connection with a bottom end through a plurality of tubes disposed within a shell; the top end comprising an inlet for a urea/carbamate mixture and an outlet for a gas mixture comprising a stripping gas and one or more stripped compounds; the bottom end comprising an outlet for a urea/carbamate stream concentrated in urea; the shell-and-tube stripper further comprising a heating fluid inlet and a heating fluid outlet in fluid connection with a shell-side space disposed between the plurality of tube and the shell, and a steam belt distributor and an inlet deflector for homogenizing a flow of steam near the healing fluid inlet; the shell-and-tube stripper having a longitudinal direction and lateral cross sections, the longitudinal direction being parallel to the tubes and the lateral cross sections being perpendicular to the longitudinal direction; wherein a plurality of baffles are arranged in the shell-side space, the baffles defining a multi-pass crossflow in the shell-side space, wherein the baffles are parallel with the lateral cross sections within a margin of error of less than 1°; and wherein the stripper further comprises a plurality of deflectors positioned in a flow path, wherein the deflectors are at oblique or right angles with respect to the baffles;
providing the urea/carbamate mixture to the inlet for the urea/carbamate mixture;
providing a heating fluid to the shell-side space by means of the heating fluid inlet;
contacting the urea/carbamate mixture and the stripping gas in a tube-side space disposed within the tubes, and heating the urea/carbamate mixture by means of the heating fluid, thereby obtaining a urea/carbamate stream concentrated in urea;
extracting the urea/carbamate stream concentrated in urea at the outlet for the urea/carbamate stream concentrated in urea;
extracting a gas mixture comprising one or more stripped compounds at the outlet for the gas mixture, the one or more stripped compounds comprising $NH_3$, $CO_2$, and water; and
extracting the heating fluid at the heating fluid outlet.

* * * * *